United States Patent
Genc-Kaya et al.

(10) Patent No.: US 10,614,480 B2
(45) Date of Patent: Apr. 7, 2020

(54) METHOD AND APPARATUS FOR RETURN ON INVESTMENT IMPACT REPORTING

(71) Applicant: Groupon, Inc., Chicago, IL (US)

(72) Inventors: Latife Genc-Kaya, Chicago, IL (US); Kamson Lai, Chicago, IL (US); Raju Balakrishnan, Chicago, IL (US); Natalia Corominas, Chicago, IL (US); Cristian Orellana, Chicago, IL (US); Amit Koren, Chicago, IL (US); Gaston L'Huillier, Chicago, IL (US); Francisco Larrain, Chicago, IL (US); Adam Geitgey, Chicago, IL (US); Jadam Kahn, Chicago, IL (US); Mike Aparicio, Chicago, IL (US); Michael Hines, Chicago, IL (US); Shafiq Shariff, Chicago, IL (US); Todd Webb, Wheaton, IL (US); Derek Nordquist, Chicago, IL (US)

(73) Assignee: GROUPON, INC., Chicago, IL (US)

(*) Notice: Subject to any disclaimer, the term of this patent is extended or adjusted under 35 U.S.C. 154(b) by 244 days.

(21) Appl. No.: 13/841,854

(22) Filed: Mar. 15, 2013

(65) Prior Publication Data
US 2014/0114741 A1    Apr. 24, 2014

Related U.S. Application Data

(60) Provisional application No. 61/682,762, filed on Aug. 13, 2012.

(51) Int. Cl.
*G06Q 30/02*    (2012.01)

(52) U.S. Cl.
CPC ..... *G06Q 30/0242* (2013.01); *G06Q 30/0247* (2013.01)

(58) Field of Classification Search
CPC .................................................. G06Q 30/0242
(Continued)

(56) References Cited

U.S. PATENT DOCUMENTS 7,065,494 B1    6/2006 Evans
7,689,456 B2 *  3/2010 Schroeder et al. .......... 705/7.31
(Continued)

OTHER PUBLICATIONS

Office Action for U.S. Appl. No. 13/841,347 dated Jan. 20, 2015.
(Continued)

*Primary Examiner* — Azam A Ansari
(74) *Attorney, Agent, or Firm* — Alston & Bird LLP

(57) ABSTRACT

The method, apparatus and computer program product described herein is configured to train and deploy a predictive model that is configured to generate a predicted ROI value for a provider with respect to a current promotion or a future promotion. An example embodiment may comprise receiving input indicative of one or more attributes of a provider or a promotion. The example embodiment may further comprise generating at least one of a predicted return on investment (ROI) value or a predicted ROI component value based at least in part on the one or more attributes of the provider or the promotion and a ROI prediction model. The method may further still comprise generating a merchant impact report including the at least one of the predicted ROI value or the predicted ROI component value for the promotion.

24 Claims, 19 Drawing Sheets

(58) Field of Classification Search
USPC .................................................. 705/14.46
See application file for complete search history.

(56) References Cited

U.S. PATENT DOCUMENTS

| | | |
|---|---|---|
| 7,949,633 B1 | 5/2011 | Shaver et al. |
| 10,235,696 B1 | 3/2019 | L'Huillier et al. |
| 2004/0093296 A1 | 5/2004 | Phelan et al. |
| 2004/0260588 A1* | 12/2004 | Bowen ............. G06Q 10/06311 |
| | | 705/7.13 |
| 2007/0265980 A1 | 11/2007 | Sehgal |
| 2009/0204490 A1* | 8/2009 | Squillace ............... G06Q 30/02 |
| | | 705/14.35 |
| 2009/0234710 A1 | 9/2009 | Belgaied Hassine et al. |
| 2010/0042533 A1 | 2/2010 | Rose et al. |
| 2010/0145773 A1 | 6/2010 | Desai et al. |
| 2012/0004975 A1 | 1/2012 | Satyavolu et al. |
| 2012/0117153 A1* | 5/2012 | Gunasekar ............ G06F 17/289 |
| | | 709/204 |
| 2012/0209673 A1 | 8/2012 | Park |
| 2013/0138563 A1 | 5/2013 | Gilder et al. |
| 2019/0156367 A1 | 5/2019 | Dean et al. |

OTHER PUBLICATIONS

Communication for International Application No. PCT/US2013/054714 dated Dec. 31, 2013.
U.S. Appl. No. 13/832,804, filed Mar. 15, 2013, In re: L'Huillier entitled *Method for Determining Provider Parameters Including a Provider Margin.*
U.S. Appl. No. 61/770,174, filed Feb. 27, 2013, In re: L'Huillier entitled *Method for Determining Provider Parameters Including a Provider Margin.*
International Search Report and Written Opinion for Application No. PCT/US2013/054714 dated Mar. 7, 2014.
Pullen, N. LF, *A Strategic Analysis of an Online Coupon Firm,* Simon Fraser University (Spring 2011), 67 pages.
Tuten, T. L. et al., *Promotional Strategies for Small Businesses: Group Buying Deals,* Small Business Institute Journal, vol. 7, No. 2, (2011), pp. 15-29.
Office Action for U.S. Appl. No. 13/841,347 dated Oct. 7, 2015.

* cited by examiner

METHOD AND APPARATUS FOR RETURN ON INVESTMENT IMPACT REPORTING

CROSS-REFERENCE TO RELATED APPLICATIONS

This non-provisional application claims the benefit of U.S. Provisional Patent Application No. 61/682,762, filed Aug. 13, 2012, the entire contents of which are incorporated herein by reference.

This application is also related to application Ser. No. 13/841,347 entitled UNIFIED PAYMENT AND RETURN ON INVESTMENT SYSTEM filed Mar. 15, 2013, the entire contents of which are incorporated herein by reference.

TECHNICAL FIELD

The present description relates to an effective and efficient way to better communicate a return on investment value to a merchant of running a transaction, such as a promotion, and determine a transaction structure that is conducive to the goals of the merchant, the customer, the promotion system, or any combination thereof. This description more specifically relates to how to provide real-time ROI calculations that a merchant and sales representative may collaboratively and simultaneously work on to identify a transaction structure for the merchant to select.

BACKGROUND

Promotion and marketing services often work with merchants to identify promotions to offer to potential customers. By developing appropriate promotions, merchants may increase profit, a promotion and marketing service may generate revenue, and customers may find new and interesting goods and/or services at discount prices.

After offering a promotion on behalf of a merchant, the promotion and marketing service may distribute revenue to the merchant for promotions sold to customers. However, when a customer seeks a refund of a promotion, the merchant may not be owed any money for the refunded promotion. In order to account for potential refunds, the promotion and marketing service may pay merchants less than what is fully owed. If there are refunds, the promotions system reduces the outstanding amount due to the merchant by the merchant's share of the refunded revenue (or, in the case of a merchant that has already been paid the entire amount due or that has an outstanding amount due to the promotion and marketing service, the reduction is carried over into another session: the next promotion).

Applicant has identified deficiencies and problems associated with the use of these systems. As described in detail below, Applicant has solved these identified problems by developing a solution that is embodied by the present invention.

BRIEF SUMMARY

In some example embodiments, a promotions system may be configured to generate a real-time ROI as output for one or more promotions. In some examples, the ROI may be operable to optimize the selection of promotions during negotiation between merchants and a promotion and marketing service. The system includes a communications interface configured to receive inputs indicative of one or more attributes of the promotion, an upsell amount exceeding a value of the promotion, and one or more indicators of repeat business in response to the promotion, and a processor in communication with the interface.

The system provides, in some examples, a better way to communicate the value to merchants of running a promotion and arrive at a deal structure that works for both the merchant and the promotion and marketing service. The system avoids sub-optimal deals for merchants that result from the merchant's lack of understanding. The real-time ROI calculation tool allows merchants and sales representatives to collaboratively work at the same time with common visual representation. A sales representative may dynamically lock or unlock certain fields from merchant manipulation, may allow off-line merchant manipulation of the tool, and may enable the use of predictive wizards, analytics/demographic information, and similar promotions to help arrive at a deal structure. The real-time ROI calculation tool also, for example, provides a similar view on the sales representative's side as the merchant's side, so that changes made on either side are immediately reflected by both the sales representative's side and the merchant's side. The sales representative may decide to lock certain fields to prevent a merchant from editing. The system also notifies the sales representative when a merchant opens and edits the ROI criteria.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

BRIEF DESCRIPTION OF THE DRAWINGS

The system, method and product may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
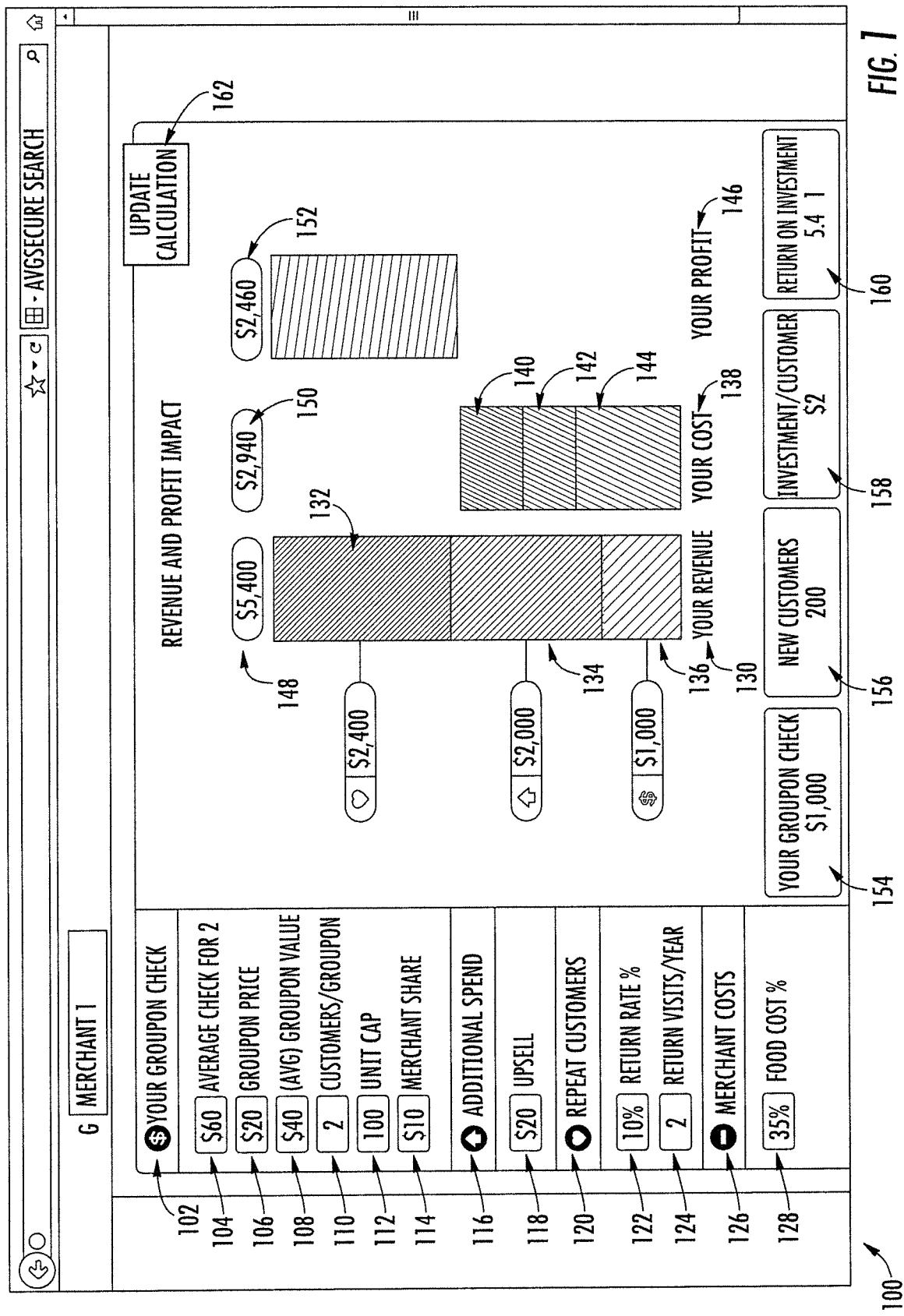
FIG. 1 shows an example graphical consumer interface for merchants in accordance with example embodiments.

The principles described herein may be embodied in many different forms. Not all of the depicted components may be required, however, and some implementations may include additional, different, or fewer components. Variations in the arrangement and type of the components may be made without departing from the spirit or scope of the claims as set forth herein. Additional, different or fewer components may be provided.

Definitions

As used herein, a promotion may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using a running company as the example merchant, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, using the running company promotion as an example, the accepted value is $25 and the promotional value is $50. In this example, the residual value may be equal to the accepted value.

As used herein, a promotion and marketing service may include a service that is accessible via one or more computing devices and is operable to provide example promotion and/or marketing services on behalf of one or more providers that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue vouchers upon acceptance of an offer, participate in redemption, generate rewards, provide a point of sale device or service, issue payments to providers and/or or otherwise participate in the exchange of goods, services or experiences for currency, value and/or the like. The service may additionally process refund requests received from consumers who have been issued vouchers. For example, using the aforementioned running company promotion, a customer who has paid the service $25 for a voucher, may subsequently request a refund of the residual value of the promotion in conjunction with returning and/or otherwise invalidating the voucher. The promotion and marketing service may accordingly credit $25 to the customer and ensure that the voucher is destroyed and/or otherwise invalidated.

As used herein, a voucher may include, but is not limited to, any type of gift card, tender, electronic certificate, medium of exchange, or the like that embodies the terms of the promotion from which the voucher resulted and may be used toward at least a portion of the purchase, acquisition, procurement, consumption or the like of goods, services and/or experiences. In some examples, the voucher may take the form of tender that has a given value that is exchangeable for goods, services and/or experiences and/or a reduction in a purchase price of a particular good, service or experience. In some examples, the voucher may have multiple values, such as accepted value, a promotional value and/or a residual value. For example, using the aforementioned example of a running company, the promotional value may be received as an electronic indication in a mobile application that shows $50 to spend at the running company. In some examples, the accepted value of the voucher is defined by the value exchanged for the voucher. In some examples, the promotional value is defined by the promotion from which the voucher resulted and is the value of the voucher beyond the accepted value. In some examples, the residual value is the value after redemption, the value after the expiry or other violation of a redemption parameter, the return or exchange value of the voucher and/or the like.

As used herein, an impression may include a communication, a display, or other perceived indication, such as a flyer, print media, e-mail, text message, application alert, mobile applications, other type of electronic interface or distribution channel and/or the like, of one or more promotions. For example, using the aforementioned running company as the example provider, an impression may comprise an e-mail communication sent to consumers that indicates the availability of a $25 for $50 toward running shoes promotion.

Overview

A merchant typically has several venues in which to offer the sale of the merchants' product or service. One such venue is a website, which may assist the sale of the product or service offered by the merchant. However, it may be difficult for the merchant to determine the impact to the merchant's business of using the website. To assist in determining the impact, a Return On Investment (ROI) system may be used. The ROI system, illustrated in more detail in FIG. 4, may be a server-based system configured to receive input from multiple sources, such as from a merchant computing device and a sales representative computing device, in order to determine the impact of using the website.

For example, each of the merchant computing device and the sales representative computing device may access the server-based ROI system in order to receive a revenue and profit impact (RPI) control interface 100 (discussed in more detail in FIG. 1). The merchant, via the merchant computing device, and the sales representative for the website, via the sales representative computing device, may input different parameters relevant to the impact of the website assisting in the transaction. In turn, the ROI system is configured to receive the input from the different parties, and push the RPI of the website transaction to the merchant computing device and the website-representative computing device. In this way, the merchant and the sales representative may both contribute to the determination of the impact of the website assisting in the transaction. Further, because one, some, or all of the parameters relevant to the impact of the website assisting in the transaction are changeable, the merchant and the sales representative may change various parameters to iteratively determine the impact.

The ROI system may be integrated with different systems of the website. For example, the ROI system may communicate with a historical database illustrating historical data of previous transactions. The ROI system may access the historical database in order to populate one or more parameters relevant to the impact of the website assisting in the transaction. As another example, the ROI system may communicate with a webpage database, which may store data to generate webpages. More specifically, after the merchant and the website representative agree on the terms of the transaction, the ROI system may access the webpage database, generate a webpage using the webpage database and the agreed terms of the transaction, and present the generated webpage to the merchant, via the merchant computing device, and to the website representative, via the website representative computing device. The ROI system may, in turn, receive input (such as changes) to the generated website from the merchant or the website representative.

Figure 2:
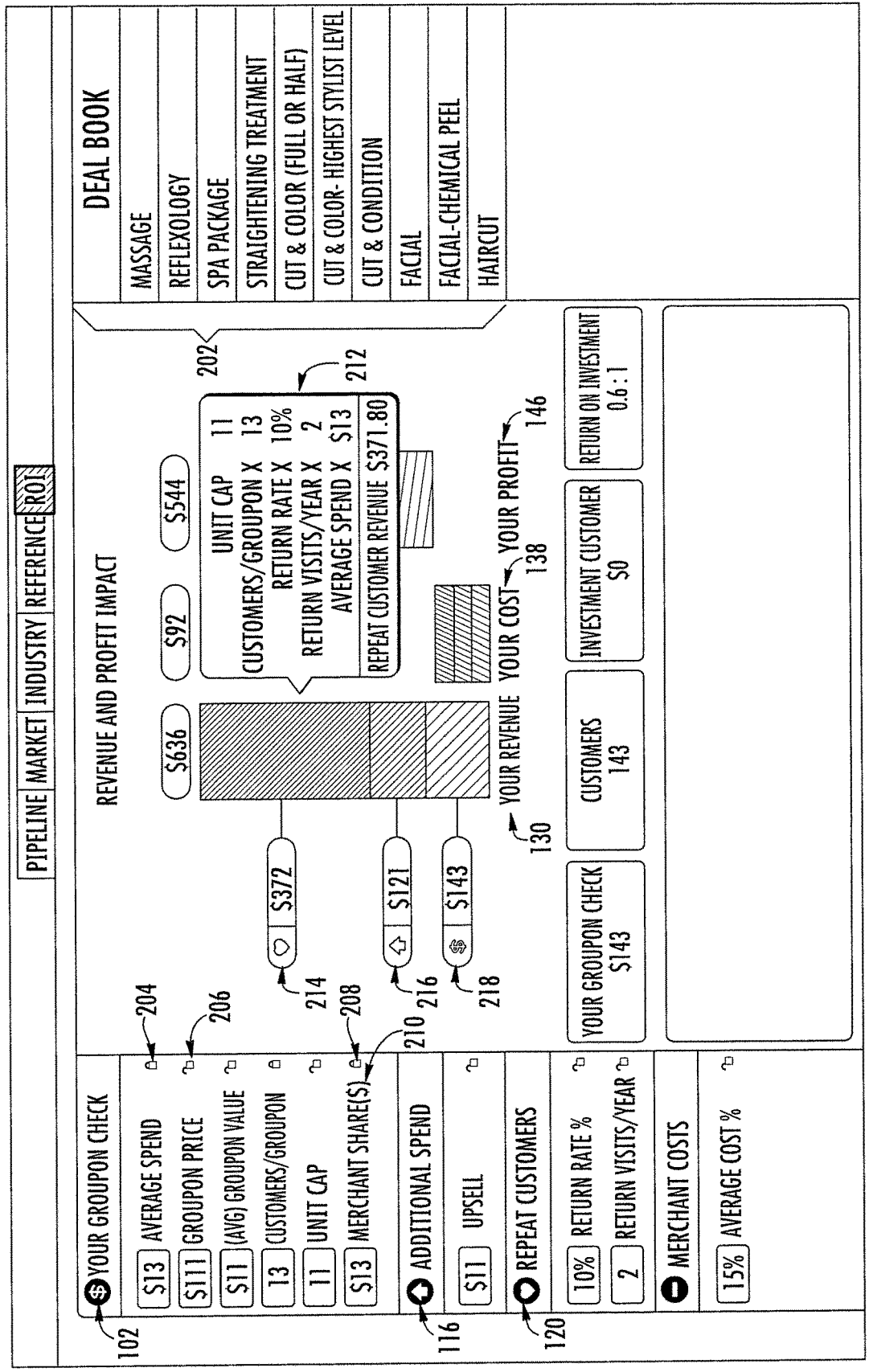
FIG. 2 shows an example revenue and profit impact control interface for sales representatives in accordance with example embodiments.

FIG. 1 shows a Revenue and Profit Impact (RPI) control interface 100 generated by the ROI system and also referred to as a return on investment (ROI) calculator for merchants. The system may generate a merchant view (as shown in FIG. 1) and a sales representative view (as shown in FIG. 2). As discussed above, the RPI control interface 100 illustrates the revenue and profit impact of using the website to assist in the merchant transaction.

As one example, the transaction may comprise a promotion facilitated by the website. In particular, the transaction may comprise a promotion in the form of a Groupon® voucher, example terms of which are illustrated in FIG. 1, from the perspective of the merchant. The terms shown in FIG. 1 are for illustration only, and other types of transactions are contemplated.

The RPI control interface 100 illustrates one or more parameters related to the promotions. For example, the RPI control interface 100 illustrates "Your Groupon Check" 102 selectable criteria, including the average check amount for two individuals 104, Groupon (voucher) Price 106, (Avg) Groupon value 108, customers per voucher 110, unit cap 112 and merchant share 114. The RPI control interface 100 provides "Additional Spend" selectable criteria 116 that includes upsell 118, "Repeat Customers" selectable criteria 120 that includes return rate percentage 122 and return visits per year 124, and "Merchant Costs" 126 selectable criteria that includes food cost percentage 128. The fields illustrated in FIG. 1 are merely for illustration purposes.

The various fields in FIG. 1 may be fixed or may be changeable via input from the merchant or sales representative. Initial entries in the various fields may be based on a past promotion offered by the merchant, or may be individual preselected by the sales representative. The initial entries may instead be randomly generated or may be generated based on entries that are historically common for similarly situated merchants (e.g., merchants having a similar merchant type, size, service, location etc.). In yet another alternative, the fields may be initially left blank initially, and are only filled in during an actual negotiation between the merchant and the sales representative. As shown in FIG. 1, for example, various fields are in gray, indicating that those fields have been locked by the sales representative and are not changeable by merchant input. In particular, fields 106, 108, 114 are illustrated in gray. By contrast, fields 104, 110, 112, 118, 122, 124, and 128, which are not grayed out, may be changed by the merchant. In this way, merchant input may be used to change various fields to better illustrate the potential effects of offering the promotion. For example, the return rate 122 may initially be populated with a predetermined percentage based on historical analysis of previous promotions. Thereafter, the return rate 122 may be changed via consumer input. In this way, the RPI control interface 100 may be used iteratively to determine the potential effect of offering the promotion program.

The average check for two 104 identifies the average amount a single party of customers spends at a merchant's business in a single visit. The Groupon Price 106 identifies the amount at which a Groupon customer will purchase the merchant's offer. As one example, Groupon may offer at least a 50% discount of the average retail value to attract new customers to the merchant's business. The (Avg) Groupon Value 108 identifies the promotional amount a customer receives toward the purchase of specified goods or services at the merchant's. For promotions related to experiences, this is the amount a customer typically spends for items included in the experience. The Customers/Groupon 110 identifies the average size of a party for a single visit (e.g., 3 out of 4 merchants report that Groupon customers bring friends when redeeming their Groupon voucher). For experiences, this represents the number of customers who will participate in the experience. The Unit Cap 112 identifies the number of units that Groupon can sell over the duration of a promotion campaign. Based on previous history, it is estimated that approximately 20% of units will be redeemed in each of the first and last months of the campaign, with a continuous stream of redemptions in the intervening months. The Merchant Share 114 identifies the revenue that the merchant may expect to receive from a Groupon. The merchant receives payment shortly after the merchant's offer is purchased, so that the payment can be used to help pay down costs associated with producing the merchant's offer.

The Merchant Share 114, which may otherwise be known as the provider margin, may be manually entered or may be automatically calculated by the ROI system based on one or more of the following values: a historical information margin that compares reviews of the merchant to reviews of similar merchants; a provider profile margin, taking into account a merchant quality score; a promotion structure margin, which takes into account the size of the discount, the Unit Cap 112, historical margins, and margins for similar discounts and units; or a positive ROI margin, which identifies a minimum margin that provides the merchant with a positive ROI. Such values may be used alone or aggregated through a linear combination or other similar aggregation method. Further explanation of such values and associated calculations is provided by U.S. Provisional Patent Application 61/770,174, titled "Smart Pricing," and U.S. patent application Ser. No. 13/832,804, titled "Smart Pricing," which are each respectively incorporated by reference in their entireties.

The "Additional Spend" 116 selectable criteria include upsell amount 118, which identifies the amount a customer spends on goods or services that exceeds the value of the Groupon voucher. Based on analysis of previous Groupon voucher redemptions, it is estimated that customers on average spend 55% more than the value of their Groupon voucher.

The "Repeat Customers" 120 selectable criteria includes Return Rate % 122 that identifies the percentage of new customers the merchant typically attracts back to the merchant's business. Based on analysis of repeat customers, the system estimates that the return rate % 122 for customers whose arrival is prompted by purchasing a Groupon is similar to that of other new customers who come in.

The "Merchant Costs" 126 selectable criteria includes Food Cost % 128 that identifies the incremental (variable) cost to produce the value of the Groupon voucher. With Groupon, this cost may be incurred when a customer redeems his or her voucher. Average food and beverage costs may range from 28-35% of the purchase price.

The merchant's revenue ("Your Revenue") 130 includes revenue from "Repeat Customer Revenue" 132, "Additional Spend Revenue" 134 and "Your Groupon Check" 136. As shown in FIG. 1, the ROI system calculates repeat customer revenue 132 using the following formula:

$$\text{Repeat Customer Revenue} = \text{Unit Cap} \times \frac{\text{Customers}}{\text{Groupon}} \times$$

$$\text{Average Check for 2} \times (\text{Return Rate \%}) \times \frac{\text{Return Visits}}{\text{Year}}$$

In this example, with a unit cap of 100, 2 customers per Groupon, an average check for two of $60, a return rate of 10%, and 2 return visits per year, the repeat customer revenue 132 of this example is 100×2×60×10%×2, or $2,400.

Further, the ROI system calculates additional spend revenue 134 using the following formula:

Additional Spend Revenue=Unit Cap×Average Upsell

In this example, with a unit cap of 100 and an average upsell of $20, the additional spend revenue 134 of this example is 100×20, or $2,000.

Finally, the ROI system calculates Your Groupon Check revenue 136 using the following formula:

Your Groupon Check=Unit Cap×Merchant Share

In this example, with a unit cap of 100 and a merchant share of $10, the Your Groupon Check revenue 136 is 100×10, or $1,000.

Accordingly, the merchant's revenue 148 in this example is $2,400+$2,000+$1,000=$5,400.

The merchant's cost ("Your Cost") 138 includes Repeat Revenue Cost 140, Additional Spend Cost 142, and Check Cost 144. The ROI system calculates the costs by multiplying the corresponding revenue by Food Cost % 128. Accordingly, the repeat revenue cost 140 is the repeat customer revenue 132 multiplied by the Food Cost 128, or $2,400× 35%=$840. The additional spend cost 142 is the additional spend revenue 132 multiplied by the Food Cost 128, or $2,000×35%=$700. Finally, the check cost 144 is the Unit Cap 112 multiplied by the Average Groupon Value 108 multiplied by the Food Cost 128, or 100×$40×35%=$1,400.

Accordingly, the merchant's cost 150 in this example is $840+$700+$1,400=$2,940.

The ROI system calculates the merchant's profit (identified as "Your Profit" 146) as Your Revenue 148 (shown as $5,400) minus Your Cost 150 (shown as $2,940), which equals Your Profit 152 (shown as $2,460).

The number of new customers 156 brought in by the promotion can be calculated by the ROI system as the unit cap 100 multiplied by the number of customers per Groupon, or 100×2=200. The investment per customer 158 is the check cost 144 minus the Your Groupon Check cost 154 divided by the number of new customers 156, or ($1,400-$1,000) ÷200=$2.

Finally, the Return On Investment (ROI), which comprises the revenue generated by each dollar spent on marketing using promotions, can be viewed as a ratio of the merchant's revenue 148 to the Your Groupon Check cost 154. With a revenue of $5,400 and total spent of $1,000, the ROI system in this example produces a ROI ratio 160 of $5,400:$1,000, or 5.4:1.

The ROI system may automatically update each of the above calculations and graphical representations as values are entered in the criteria fields and/or when the consumer selects the "update calculation" 162.

FIG. 2 shows a revenue and profit impact control interface 200 generated by the ROI system for sales representatives. The sales representative may control whether an ROI criteria is selectable (editable) by the merchant from the merchant's view. The sales representative may use the revenue and profit impact control interface 200 to lead a dialogue with the merchant to determine a mutually agreeable ROI for the merchant. The ROI criteria values may be selected (e.g., by the sales representative) and/or automatically selected by the system based on the merchant, merchant type or some other criteria. Reference deal structures may be used to prefill the values to pre-populate the return on investment calculations. For example, the sales representative may select a default set of ROI criteria from a repository of promotion criteria 202. The values entered by the merchant and/or the sales representative are adjusted on the graphical display in real-time. In this regard, functions described herein as real-time need not actually occur without any delay at all, but may occur without perceivable delay, or in other words, in substantially near real-time. In one such embodiment, the graphical representation may be updated using a third party service (e.g., www.pusher.com, which may perform updates with an average delay of 5 milliseconds) that is responsive to values entered by the merchant and/or the sales representative. The system provides a way to build a live graphical representation of a return on investment calculation collaboratively by a merchant and sales representative.

The sales representative view includes consumer selectable icons (e.g., 204, 206, 208, 210) that may not be viewable or selectable by the merchant. For example, the sales representative view includes "lock" icons (e.g., 204, 206, 208) that can be toggled to lock or unlock a parameter. As another example, the data format of a field may be changed. For example, the "merchant share" may be represented as a percentage of the total revenue or a dollar amount for the "merchant share" data format, by toggling icon 210.

The system provides mouse over 212 views for each of the sub-components of "Your Revenue" 130 (e.g., "repeat customer" 214, "additional spend" 216, "merchant share" 218), "Your Cost" 132, and "Your Profit" 134 calculations that display the calculations used to calculate the amounts in each category (130, 138, 146).

Figure 2A:
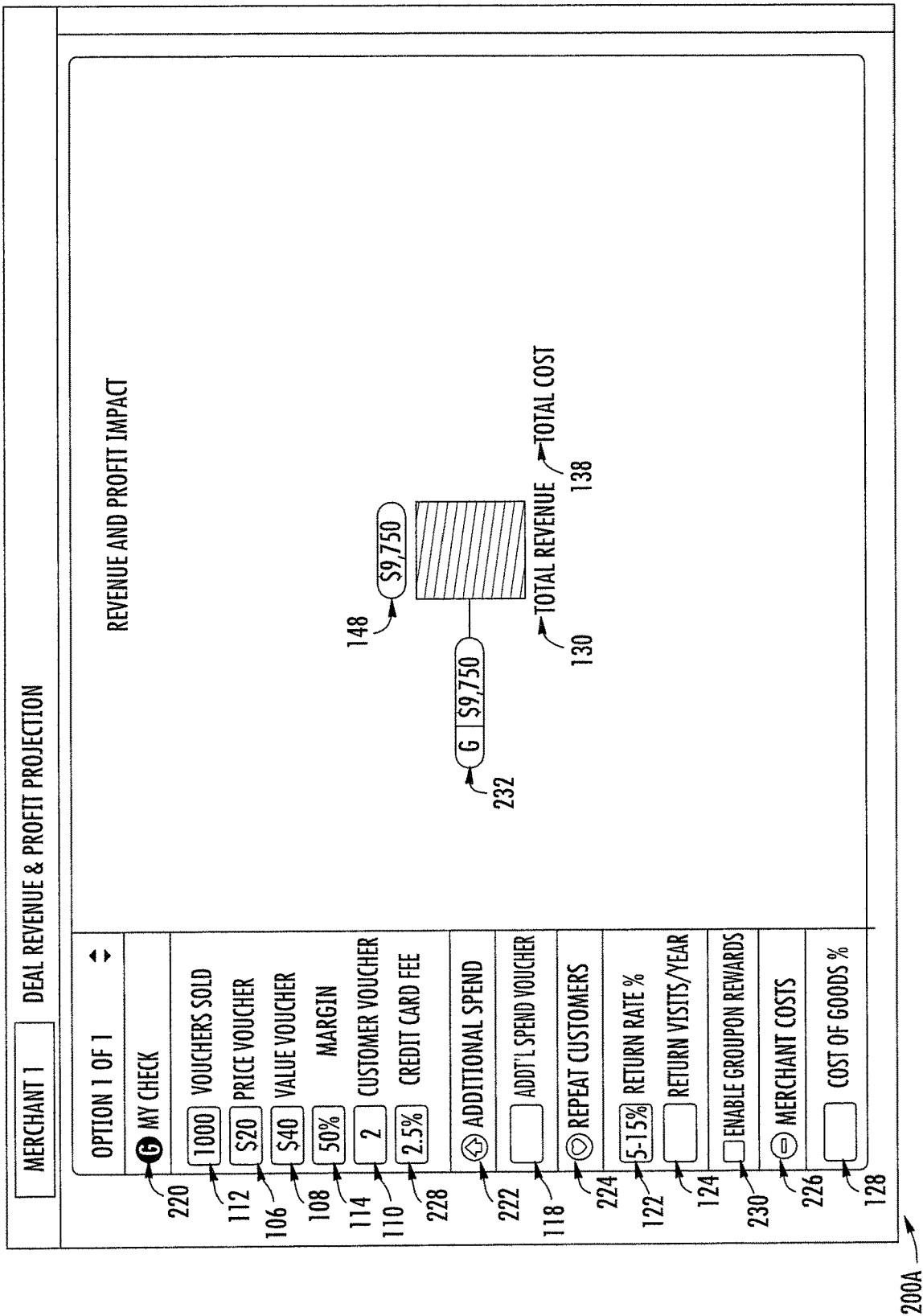
FIG. 2a shows merchant share of revenue calculation.

FIG. 2a shows the merchant share 200a of revenue calculation. The merchant share 200a of a revenue calculation may be calculated by the ROI system using the inputs to the "Your Groupon Check" 102 criteria.

Figure 2B:
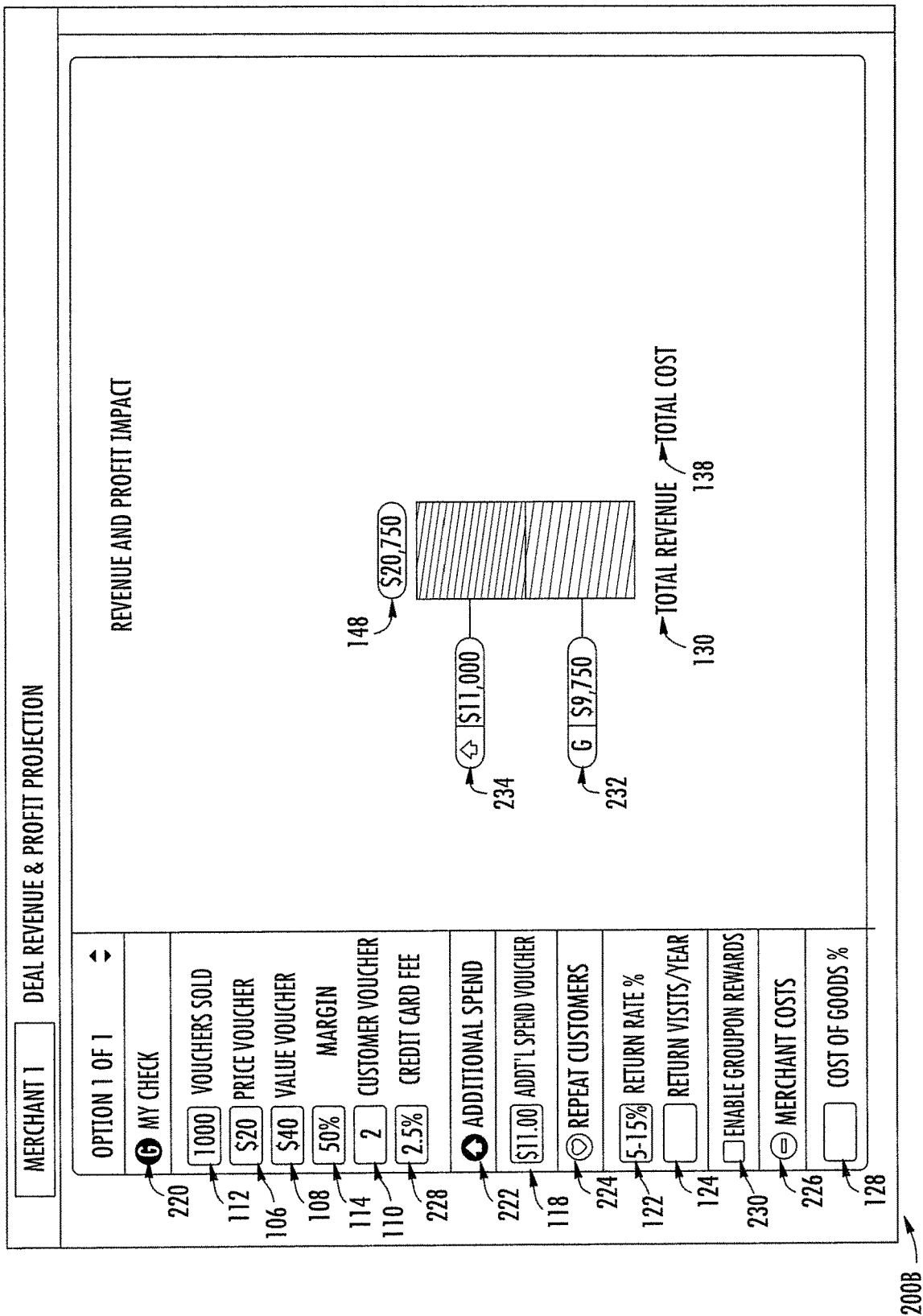
FIG. 2b shows merchant share of revenue and revenue from additional spend calculation.

FIG. 2b shows the merchant share 200b of revenue and also the revenue from the additional spend calculation. The merchant share of revenue and revenue from Additional Spend 200b calculation may be calculated by the ROI system using the inputs to the "Your Groupon Check" 102 criteria and "Additional Spend" 116 criteria.

Figure 2C:
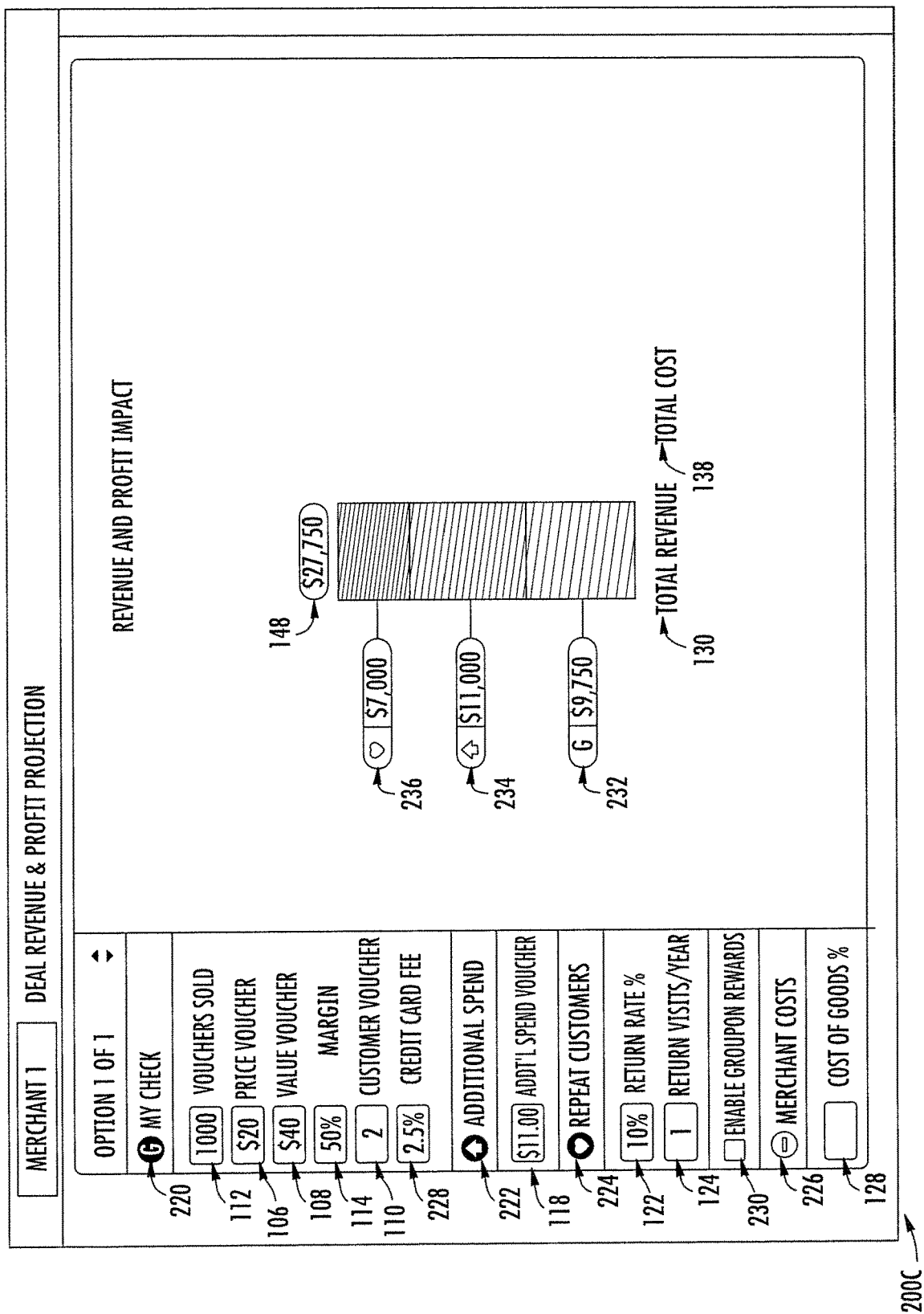
FIG. 2c shows merchant share of revenue, revenue from additional spend and repeat customer revenue calculation.

FIG. 2c shows the merchant share 200c of revenue, revenue from additional spend, and the repeat customer revenue calculation. The merchant share of revenue from additional spend and repeat customer revenue calculation 200c may be calculated by the ROI system using the inputs to the "Your Groupon Check" 102 criteria, "Additional Spend" 116 criteria and "Repeat Customer" 120 criteria.

Figure 2D:
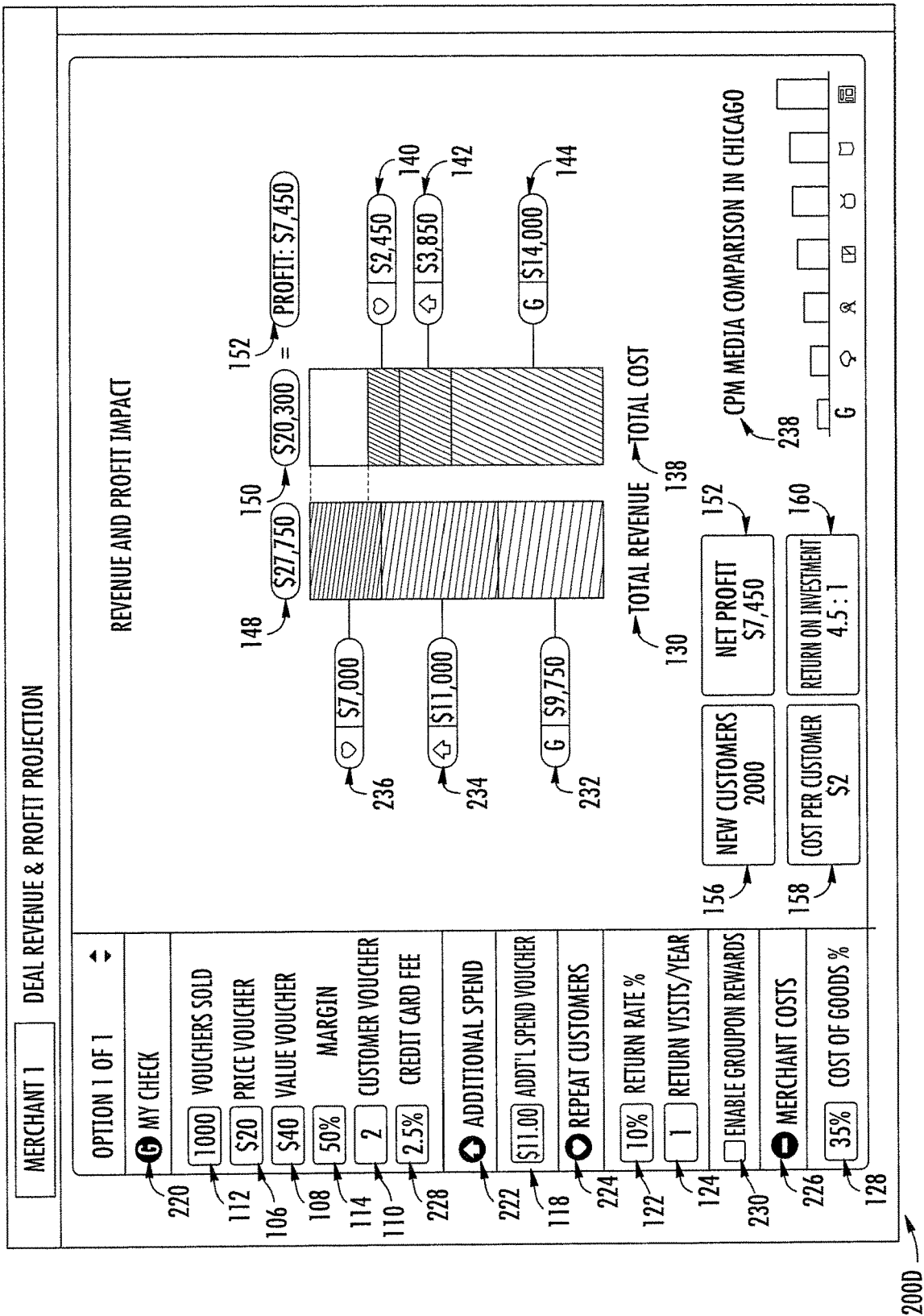
FIG. 2d shows revenue and costs according to the merchant share, additional spend and repeat customer activity.

FIG. 2d shows revenue and costs 200d according to the merchant share, additional spend and repeat customer criteria, as calculated by the ROI system.

Figure 3:
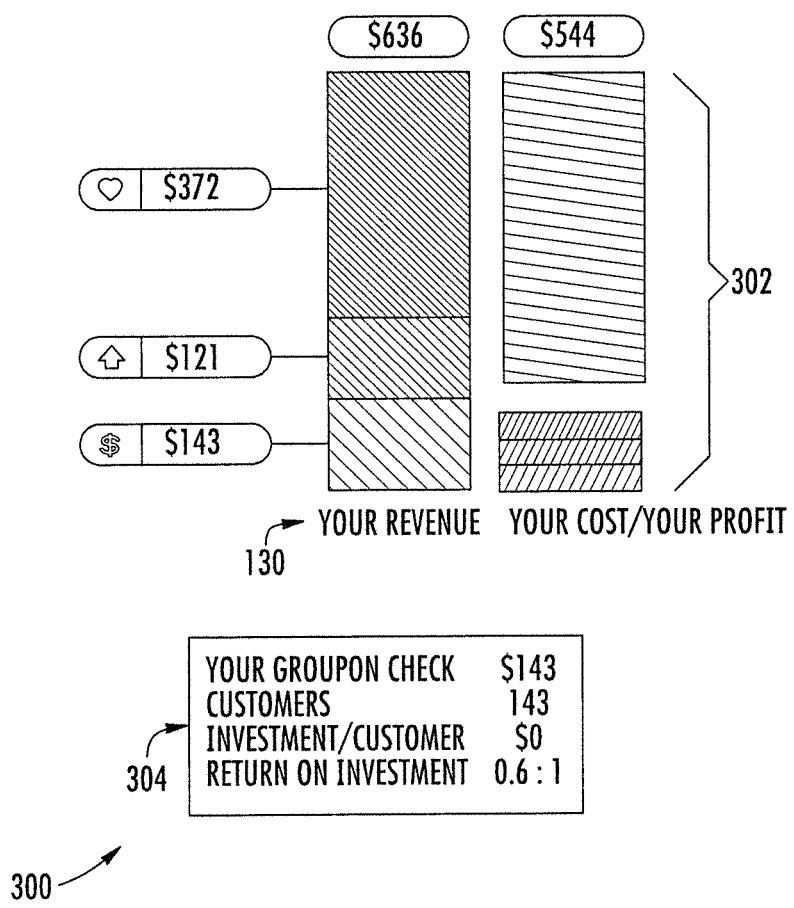
FIG. 3 shows a display interface for a mobile device.

FIG. 3 shows a mobile device display interface 300. The system may communicate the ROI interface in a way to accommodate the display of the mobile device. The sales representative may communicate the ROI calculator to a mobile device of a merchant and the ROI calculator adapts to the viewing area of the mobile device being used to view the ROI calculator. For example, the graph may be displayed in the center area of the display (e.g., using two columns instead of three columns) Depending on the capability of the mobile device display interface, the ROI system may collapse the "your cost" and "your profit" columns (see item 302), and may arrange information (e.g., 154, 156, 158, 160) so that the information is easily viewable (see item 304).

Figure 3A:
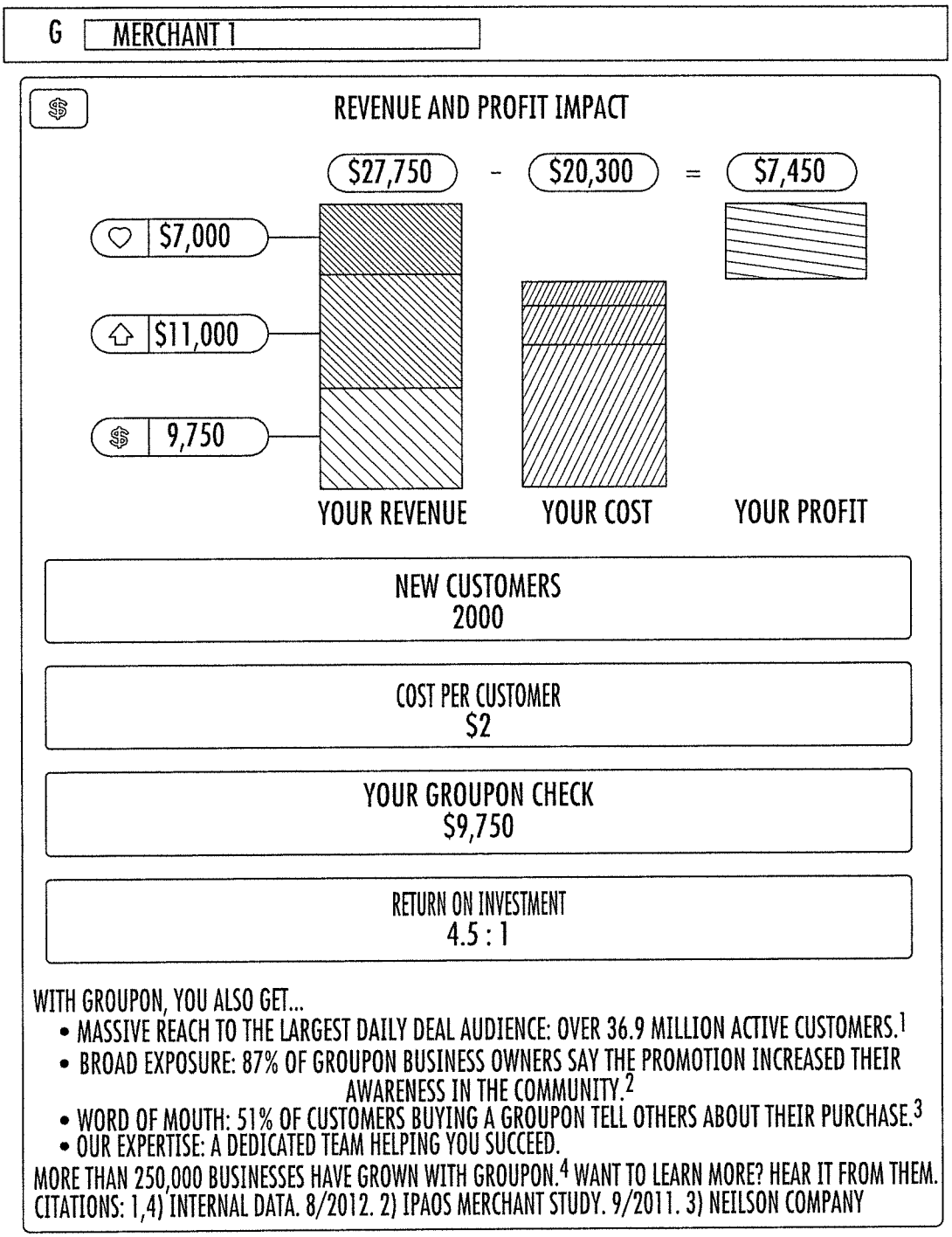
FIG. 3a shows another display interface for a mobile device.
Figure 3B:
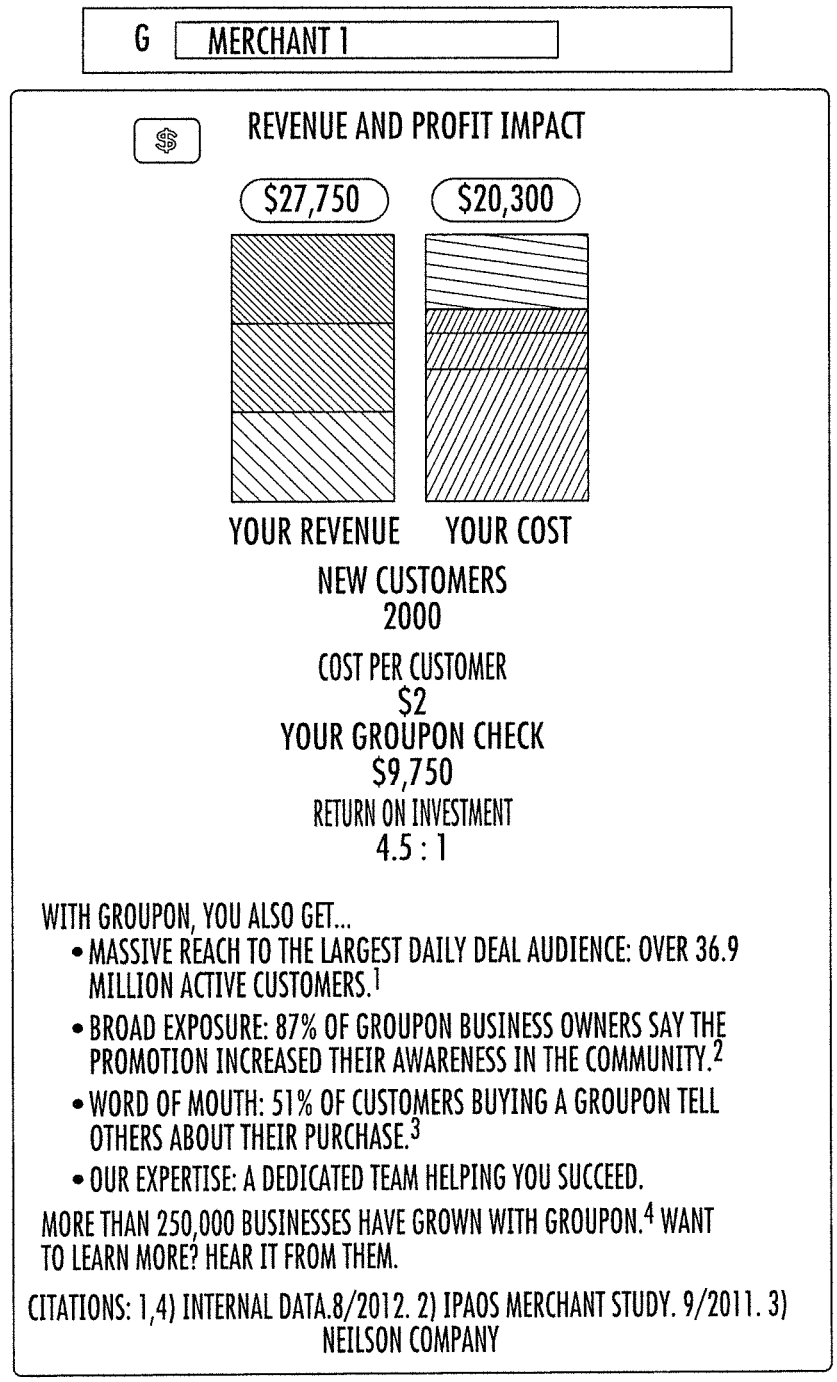
FIG. 3b shows one other display interface for a mobile device.

FIG. 3a shows another display interface 300a for a mobile device such as a tablet computing device. FIG. 3b shows one other display interface 300b for a mobile device such as a smart phone.

In some embodiments, the above-described features may be used to provide merchants with a rich source of relevant information about existing promotions. In this regard, the ROI system may populate and present to merchants a Merchant Impact Report, which enables the merchant to evaluate the performance of an existing promotion based on the previously described calculations, as well as additional data collected by the ROI system.

Figure 3C:
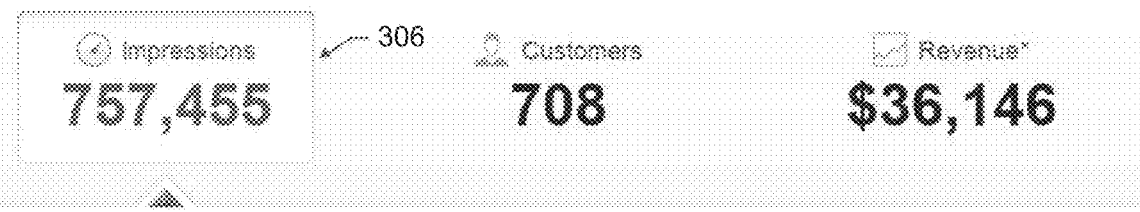
FIG. 3c illustrates an example graphical consumer interface for a merchant, showing demographic information relating to a promotion.
Figure 3C:
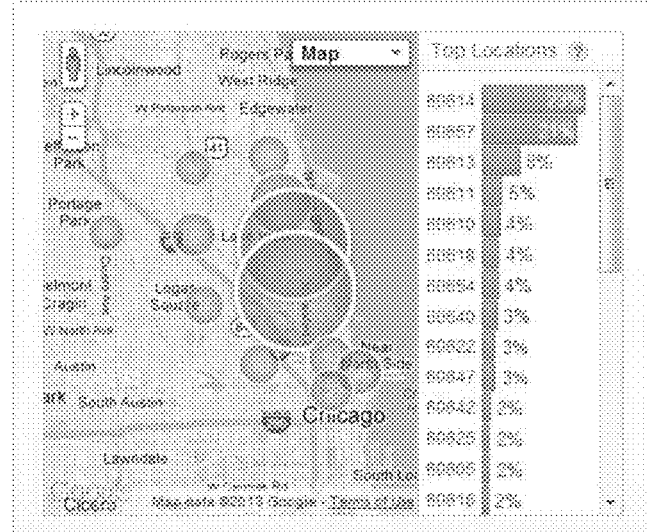
Figure 3C:
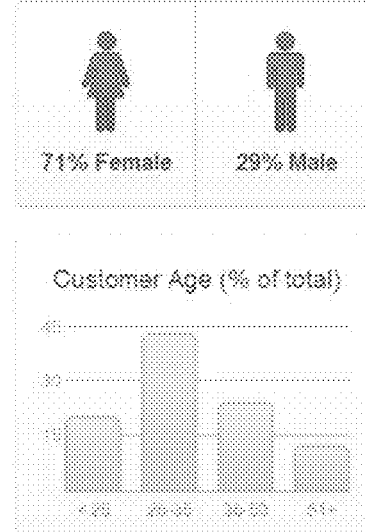

FIG. 3c shows an impressions interface 306 generated by the ROI system that may be presented to a merchant in connection with a selected promotion. The impressions interface 306 displays the number of impressions 308 of the promotion that are sent to promotion and marketing service subscribers. In this example, the impressions are sent to subscribers via email, although other delivery mechanisms (such as those described previously) are contemplated. For instance, the impressions may be distributed using a mobile device application or website.

Some fraction of subscribers receiving impressions may subsequently purchase the promotion. Because promotions are purchased from the promotion and marketing service, the promotion and marketing service is able to compile demographic information regarding the subscribers who have purchased the promotion and present such demographic information to the ROI system as attributes of the promotion. Thereafter, the ROI system can calculate, based on the attributes of the promotion, the gender, age, and zip code of the subscribers who have purchased the promotion.

Using the impressions interface 306, the ROI system is able to display to the merchant a gender representation 310 of the gender of the customers who have purchased the promotion. For instance, the gender representation 310 may include a percentage of customers who have purchased the promotion that are male and a percentage of the customers who have purchased the promotion that are female.

Similarly, the impressions interface 306 may display to the merchant an age representation 312. The age representation 312 may include the ages of customers who have purchased the promotion. In one embodiment, the age representation 312 may include a histogram showing a number of customers who have purchased the promotion in one or more age ranges.

Using the impressions interface 306, the ROI system is able to display to the merchant a representation 314 of the zip codes of the customers who have purchased the promotion. This representation may include a histogram showing a number of customers who have purchased the promotion for each zip code. The representation 314 may also include a map showing the zip codes of the customers who have purchased the promotion. In one embodiment, the map is a cluster map, which places a circle over each zip code of a customer who has purchased the promotion, and varies the size of the circle based on the number of customers in the zip code.

Although impressions interface 306 may display demographic information regarding subscribers who have purchased the promotion, the impressions interface 306 may additionally or alternatively display demographic information regarding subscribers to whom impressions have been delivered (i.e., subscribers who have been sent an email advertising the promotion).

Figure 3D:
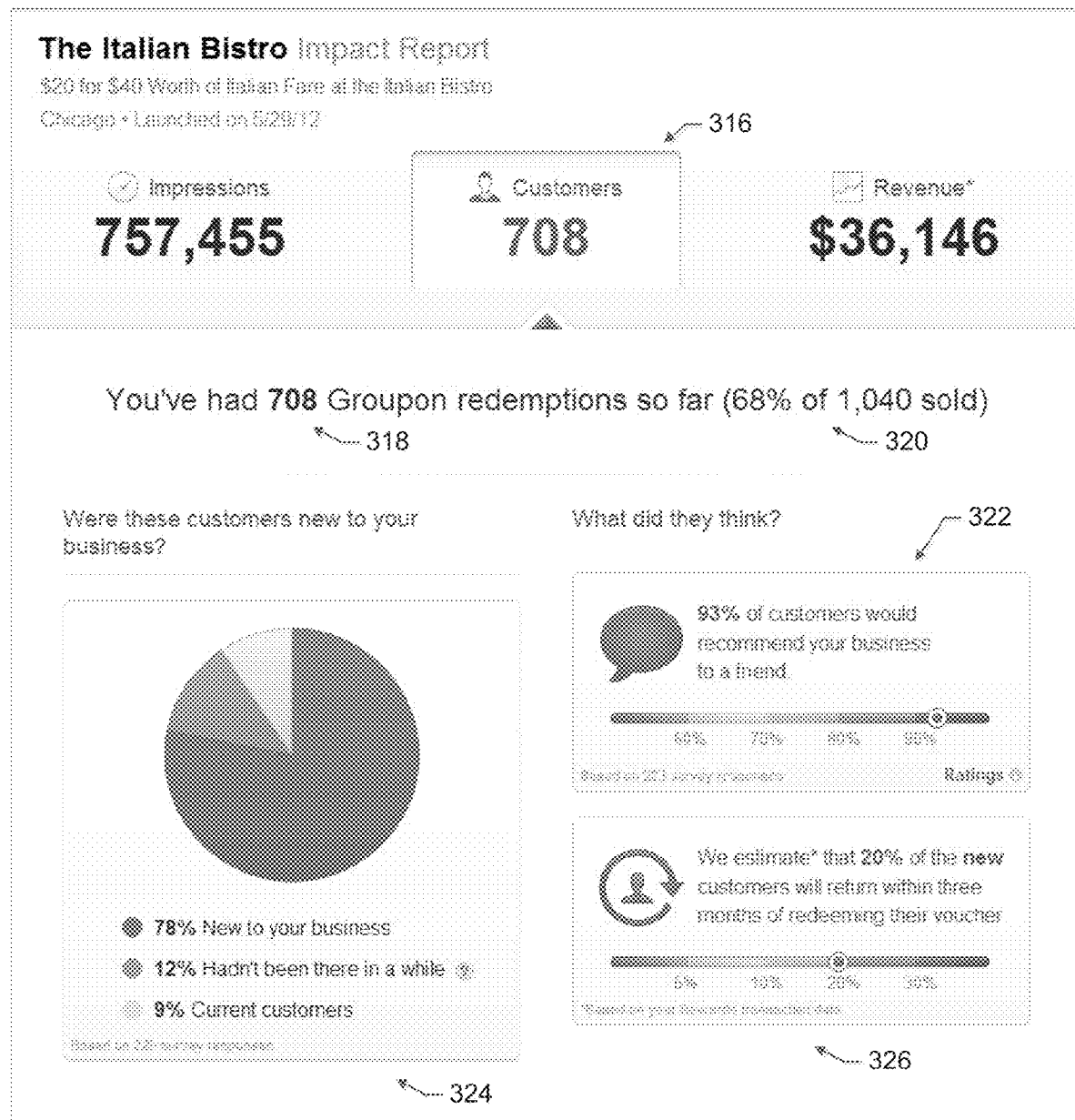
FIG. 3d illustrates an example graphical consumer interface for a merchant, showing customer survey information relating to a promotion.

FIG. 3d shows a customers interface 316, generated by the ROI system that may be presented to a merchant in connection with a selected promotion. The interface 316 displays the number of customers who have redeemed the promotion 318. In addition, the customers interface 306 may disclose the percentage of purchased promotions that have been redeemed 320. Moreover, the promotion and marketing service may request that the customers who have redeemed the promotion 318 complete surveys about their experience with the merchant. Based on the survey results, the customers interface 316 may display additional information to the merchant.

For instance, based on the survey results, the ROI system may calculate an average rating of the merchant. The customers interface 316 may then display the average merchant rating 322 (using, for instance, a number line or other similar graphical format). In one embodiment, the customers interface 316 may additionally display a percentage of customers who would recommend the merchant's business to a friend.

Similarly, based on the survey results, the ROI system may determine the number of customers who were new to the merchant at the time of redeeming the promotion and the number of customers that had not visited the merchant for a predetermined amount of time (such as three months) prior to redeeming the promotion. Accordingly, in one embodiment, the customers interface 316 may additionally display a chart 324 indicating a percentage of customers who were new to the merchant at the time of redeeming the promotion, a percentage of customers that had not visited the merchant for a predetermined amount of time prior to redeeming the promotion, and a remaining percentage of customers.

In one embodiment, the ROI system may calculate, based on customer rewards information, an estimated percentage of new customers that will return to the merchant within a predetermined amount of time of redeeming a voucher. In one embodiment, this information may be based on metrics, such as but not limited to the historical return rate of existing customers, tracked using customer rewards information. In another embodiment, it may be based on a metric that tracks the number of customers that would receive an additional promotion for returning. In yet another embodiment, the estimated percentage of new customers that will return is based on a metric generated from an evaluation of the past behavior of the new customers, as shown by the customer rewards information. Accordingly, in this embodiment, the customers interface 316 may additionally display the estimated percentage of new customers that will return to the merchant within the predetermined amount of time of redeeming a voucher 326 (using, for instance, a number line or other similar graphical format).

In some examples embodiments, there may not be a sufficient data to generate a particular metric or a set of metrics for a particular merchant, metrics may be unknown for a particular merchant, additional metrics may be required for a more specific or accurate ROI value and/or the like. In such cases, a dataset that is generated based on historical metrics (historical data, survey results, historic ROI data and/or the like) for all merchants may be used to train and/or test an ROI prediction model to approximate ROI and its components (e.g., estimate revenue from consumers who returned to merchant after a first visit, estimate amount spent by Groupon customers over the promotion discount, amount paid to the merchant for total promotions sold). For example, the ROI prediction model may be trained to classify a particular metric value as indicative of a positive ROI and/or may learn that the combination of two metrics can be used as a predictor for number of consumers who will return to a merchant after a first visit.

In some example embodiments, the machine learning model may be used to generate predictive algorithms for ROI and its components for a merchant that is running a current promotion. The machine learning model may be operable to input one or more metrics relating to the current merchant and the current promotion. Based on the similarity determined between the one or more metrics, the current promotion and/or the merchant, the ROI predictive model may generate one or more estimated metrics. The estimated metrics are suggestive of probabilistic values when compared to the trained model. In some example embodiments, the estimated metrics may be used in calculations that provide an estimate of ROI and/or ROI components. The ROI and the components thereof may therefore be predicted and displayed, such as is shown in 148-152 of FIG. 3e.

Figure 3E:
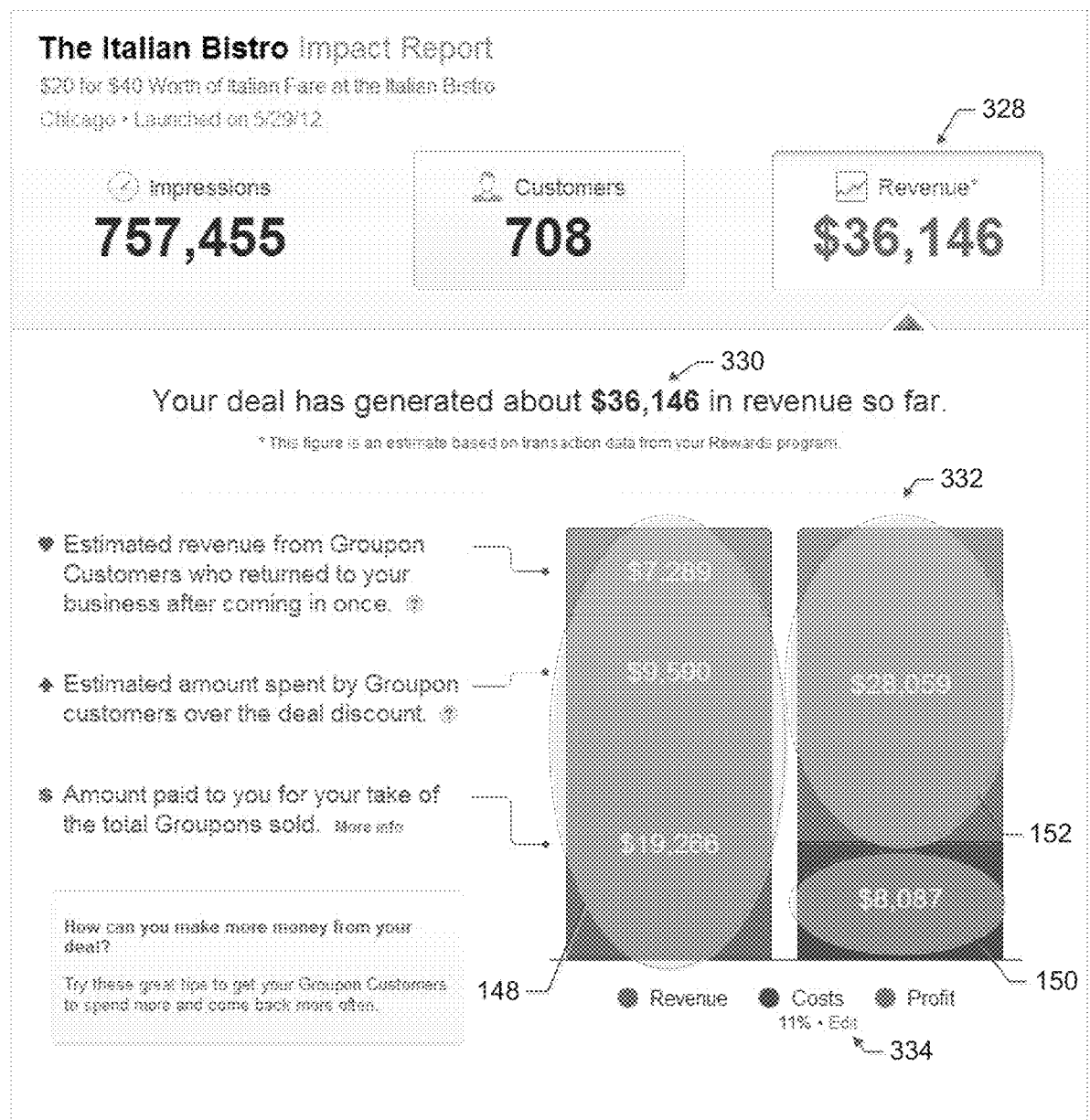
FIG. 3e illustrates an example graphical consumer interface for a merchant, showing revenue, cost, and profit information regarding a promotion.

FIG. 3e shows a revenue interface 328, generated by the ROI system, which may be presented to a merchant in connection with a selected promotion. The revenue interface 328 displays the financial impact of the promotion. For instance, it may display the revenue 330 generated by the promotion so far. Revenue 330 may comprise the merchant's revenue 148 as discussed previously. In addition, the customers interface 306 may display a breakdown of the merchant's financial information 332. This information includes the merchant's revenue 148, merchant's cost 150, and merchant's profit 152, calculated by the ROI system as previously described. In one embodiment, this financial information 332 may be displayed as a histogram.

In another embodiment, the merchant's financial information 332 may be configurable when the merchant uses an input device to select the cost editor 334. The merchant may edits its cost (e.g., projected, estimated, or actual) using the cost editor 334. For example, in the depicted embodiment, the merchant may edit its cost from 11% (as shown) to 13% upon receiving notice that its cost of materials for certain raw materials have risen.

Alternatively or additionally and in some embodiments, the ROI system may be configured to determine a positive ROI margin $\mu_r$ for display n connection with the Merchant Impact Report herein described and illustrated in connection with FIGS. 1-3f. According to one embodiment, the ROI system may be configured to determine a positive ROI margin based upon past promotions offered and the margin thresholds necessary for a positive ROI in those past promotions. In another embodiment, the ROI system may be configured to determine a positive ROI margin based at least upon a Monte Carlo simulation used to derive an empirical distribution, from which the probability of $\pi$ being positive may be determined, where $\pi$ is the profit per instrument divided by the unit price. The unit price may be defined as the price a consumer pays for the goods, services, experiences and/or the like.

In this regard, $\pi$, the profits per instrument divided by the unit price may be expressed by the equation, $$\pi = pf[(\mu+s+r)-k(v+s+r)]-p(1-f)(v-\mu)+f(1-p)$$
$$[(p+s'+r')-k(1+s'+r')]-(1-p)(1-f)(1-\mu)$$

wherein, v is the unit value divided by the unit price. The unit value may be defined as the original price of the good, service and/or experience before the promotion was offered. Further, 1. r is the average return amount spent by a consumer divided by the unit price (i.e. revenue associated with repeat business (e.g., 214) per unit price),
2. r' is the average return amount spent after the expiration of the promotion period divided by the unit price (i.e., revenue associated with repeat business after promotion expiration per unit price),
3. s is the average amount spent in addition to the promotion divided by the unit price (i.e., revenue upsale per unit price),
4. s' is the average amount spent in addition to the promotion after the promotion period expires divided by the unit price (i.e., non-redemption revenue per unit price),
5. k is the variable cost as a percentage of the total check amount (i.e., the variable cost as a percentage of the total amount of a consumer's transaction),
6. f is the new customer fraction (i.e., the amount of new consumers that had not previously purchased goods and/or services from the provider), and
7. p is the final redemption percentage (i.e., the percentage of instruments that are redeemed).

In addition, the above variables may be computed with respect to the particular merchant's category.

In estimating the positive ROI margin, the ROI system may be configured to utilize certain assumptions when performing the Monte Carlo simulations. For example, the ROI per instrument may be assumed to be independent from the volume of the units sold. As such, when $\pi$, the profits per instrument divided by the unit price, is greater than zero, the ROI may be interpreted as being positive for the promotion campaign. In some embodiments, the ROI system may assume a correlation exists between the unit price and whether a consumer purchases additional goods and services and/or returns to the provider/merchant in the future for other goods, services and the like.

According to some embodiments, the provider parameter system may also assume that redeeming promotions by existing consumers is a cannibalization of sales. Further, it may be assumed that a consumer would spend the same amount regardless of having a promotion instrument, such as a coupon. The ROI system may further assume a final redemption rate of 85%. In another embodiment, the provider parameter system may use a redemption rate percentage from the provider's past promotions. Further, it may be assumed that all expired instruments will be redeemed at the unit price. In some embodiments, the amount spent in addition to the promotion and the amount spent in a subsequent visit by a consumer may be assumed to be zero for expired instruments.

As such, the positive ROI margin may be determined using the approximated distributions obtained by the Monte Carlo simulations and consumer input data corresponding to the category of the merchant c, the discount provided d, and the cost of goods sold percentage k (e.g., 128, etc.), as represented by the equation, $$\mu_r(m_i, d) = \left\{ \mu \mid P\left(\pi\left(\mu, c_{m_i}, k_{c_{m_i}}, \frac{1}{d}\right)\right) > 0 \right\}$$

where the discount provided d is defined as 1/v. According to one embodiment, the positive ROI margin may be determined to be 0.61 for a spa and health services provider, such as Acme Spa Company.

Figure 3F:
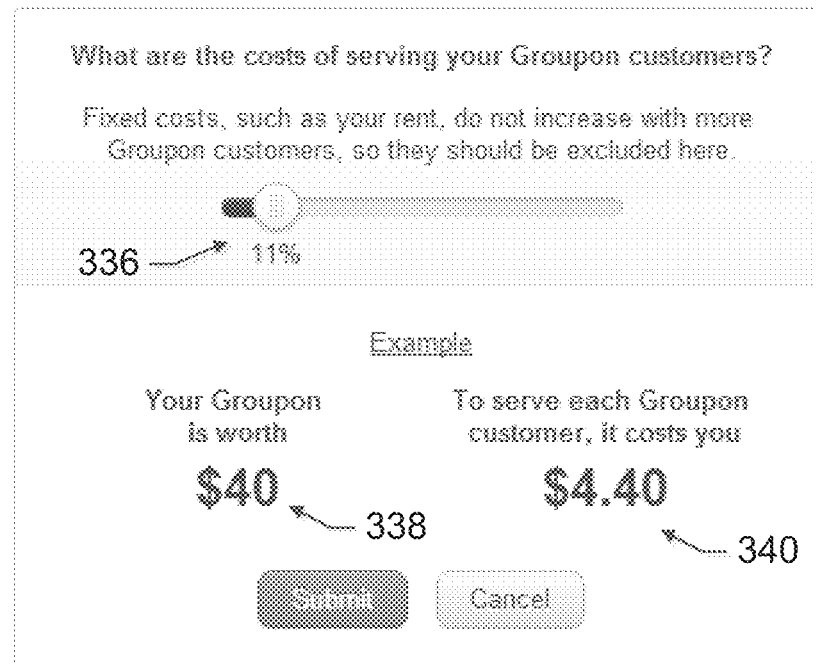
FIG. 3f illustrates an example graphical consumer interface that a merchant may use to update the marginal cost of a promotion.

FIG. 3f shows one example cost editor interface displayed by the ROI system upon merchant selection of the cost editor 334. The cost editor interface enables the merchant to select the percentage of the cost of each promotion that goes towards marginal costs of fulfilling the promotion. In one such embodiment, food cost 128, discussed previously, corresponds to the marginal cost selected using cost editor 334. In other embodiments, food cost 128 may only be one of many factors that go into a merchant's calculation of the marginal cost of fulfilling a promotion. In yet other embodiments (e.g., non-food serving embodiments such as spas, etc.), food cost 128 may not be relevant to the marginal cost of fulfilling the promotion.

In the depicted embodiment, the merchant may interact with the cost editor interface by manipulating slider 336 until the appropriate percentage is displayed. Because the marginal cost of fulfilling a promotion is highly dependent upon the merchant and the promotion offered, slider 336 enables a merchant to calculate these costs in any manner, and need not force the merchant to use a preconfigured formula. For any given percentage selected using slider 336, the cost editor interface may display the value of the promotion 338 and, based on the percentage selected using slider 336, the interface may display the marginal cost of fulfilling each promotion 340. Based on the value selected using slider 336, the merchant will be returned to the revenue interface 328, which will present an updated breakdown of the merchant's financial information 332, as recalculated by the ROI system in view of the changed marginal cost. For example, in connection with FIG. 3e, the ROI system may provide updated calculations for merchant cost 150 and merchant profit 152 based on the newly edited cost information (e.g., 13%).

Using these additional Merchant Impact Report interface tools, the ROI system enables merchants to develop a much more sophisticated understanding of the value provided by their promotions.

System Architecture

Figure 4:
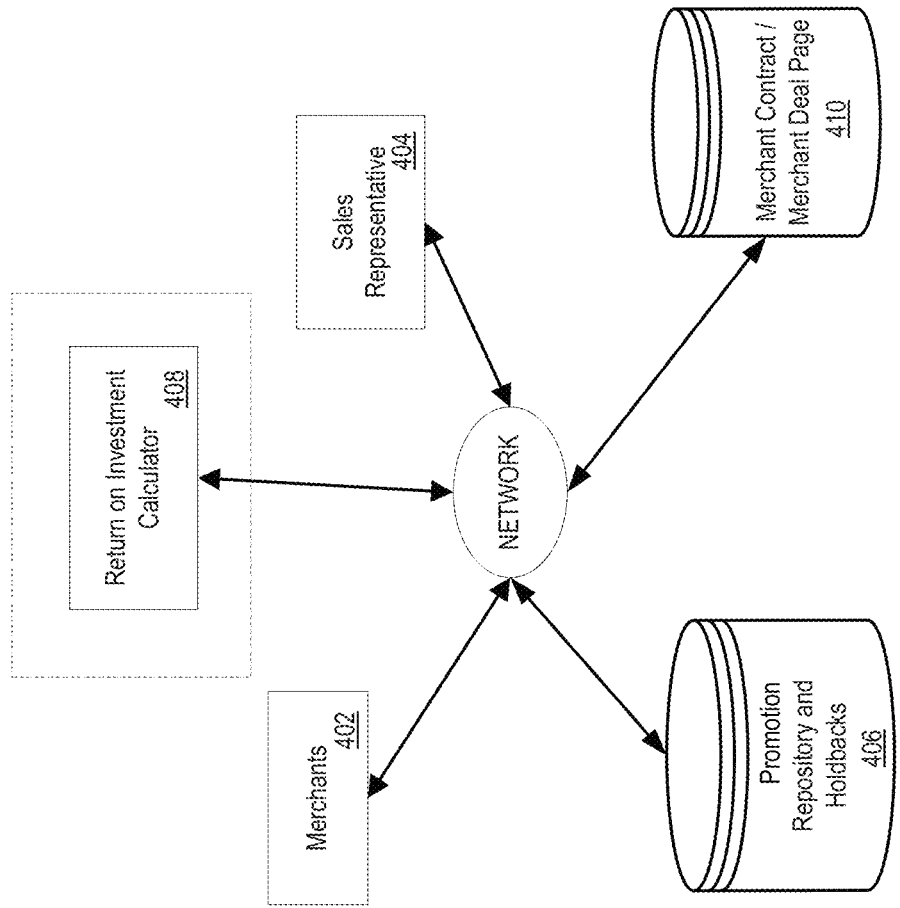
FIG. 4 shows a configuration of the ROI system.

FIG. 4 shows a configuration 400 of the ROI system. The merchant 402 and sales representative 404 may calculate multiple ROI configurations and store the ROI configurations for use (retrieval) in a promotion repository 406 to build other promotions and/or use for comparison for configuring subsequent promotions. From the ROI sales representative view, the sales representative may select, from previously calculated promotions, a default promotion for a merchant in order to initiate a dialogue with the merchant. The ROI system may generate the merchant deal page(s) (410) corresponding to the merchant's promotion that is viewable by the public in order to purchase the merchant's promotion. For example, potential customers may purchase the transaction via a website. In response to agreeing on the parameters of the transaction, the ROI system may generate a webpage for use on the website that reflects the agreed parameters of the transaction. Further, the merchant and/or sales representative may review the webpage and make changes. Similar to the determination of the parameters for the transaction, the merchant (via the merchant computing device) and the sales representative (via the website representative computing device) may both make changes to the webpage.

Return on Investment System Operations

Figure 5:
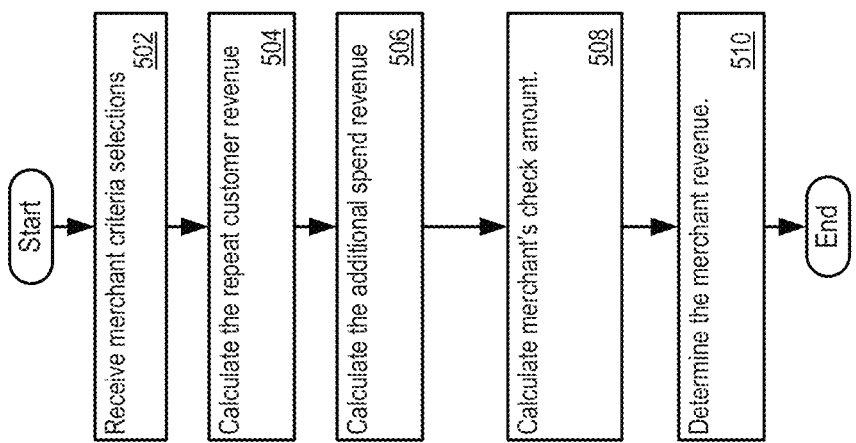
FIG. 5 shows a diagram of logic of how the merchant revenue is calculated.
Figure 6:
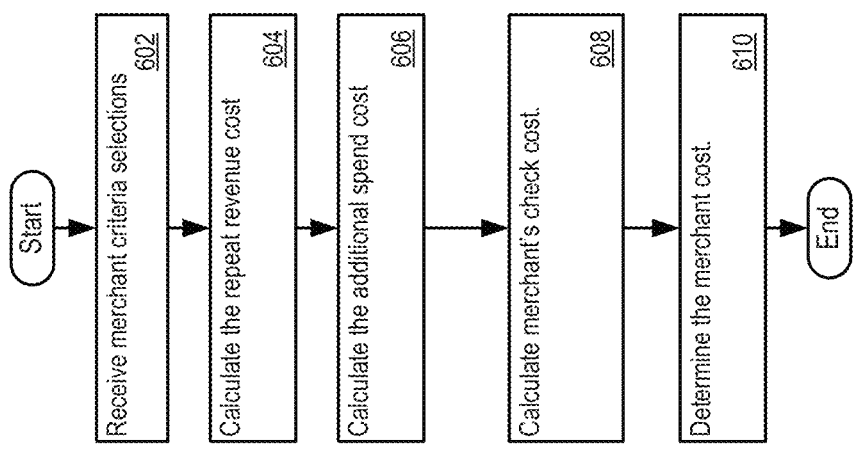
FIG. 6 shows a flow diagram of logic of how the merchant cost is calculated.
Figure 7:
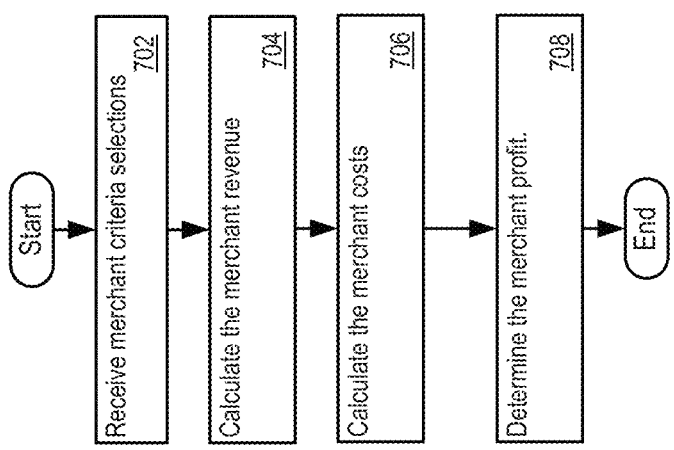
FIG. 7 shows a flow diagram of logic of how the merchant profit is calculated.

FIGS. 5-7 show example operations for generating merchant revenue, cost, profit, and ROI information. The ROI information depends upon revenue, cost, and profit related to a promotion, values which themselves may vary based on the several attributes assigned to the promotion and on projections forecasting expected customer engagement as a result of the promotion, as will be described below.

FIG. 5 shows a diagram of logic 500 of how merchant revenue is calculated. In step 502, the system receives merchant criteria selections. These selections may be received from the merchant or from a sales representative of the promotion and marketing service who interacts with the merchant. These selections comprise inputs indicative of one or more attributes of the promotion, an upsell amount, and one or more indicators of repeat business in response to the promotion. The attributes may include the average check amount for two individuals, the voucher price, the average voucher value, the number of customers per voucher, a unit cap, a merchant share, a food cost percentage, a number of impressions, and demographic information about the customers. The indicators of repeat business may include return rate percentage and return visits per year. Using the received attributes, upsell amount, and indicators of repeat business, the merchant's revenue (shown as "Your Revenue" 130 in FIG. 1) is calculated based on revenue from "repeat customer revenue" 132, "additional spend revenue" 134 and "Your Groupon Check" 136 amount calculated based on the received criteria (e.g., merchant selected criteria).

In operation 504, the ROI system calculates, based on one or more of the attributes received in operation 502, a first amount indicative of revenue generated from the promotion. In one embodiment, the repeat customer revenue is calculated using the following formula (as previously described):

$$\text{Repeat Customer Revenue} = \text{Unit Cap} \times \frac{\text{Customers}}{\text{Groupon}} \times$$

-continued $$\text{Average Check for } 2 \times (\text{Return Rate \%}) \times \frac{\text{Return Visits}}{\text{Year}}$$

In operation 506, the ROI system calculates, based on the upsell amount received in operation 502, a second amount indicative of revenue generated from promotion upsells. This second amount may comprise revenue generated from upsells attendant to administering the promotion. In one embodiment, this second amount is calculated using the following formula (as previously described):

Additional Spend Revenue=Unit Cap×Average Upsell

In operation 508, the ROI system calculates, based on the one or more indicators of repeat business received in operation 502, a third amount indicative of revenue generated from repeat business attendant to administering the promotion. In one embodiment, the merchant's check revenue 136 is calculated using the following formula (as previously described):

Your Groupon Check=Unit Cap×Merchant Share

In operation 510, the merchant's revenue is determined from the first, second, and third amounts.

Subsequently, the ROI system calculates, based on the one or more attributes of the promotion, a fourth amount indicative of costs from the promotion. In this regard, FIG. 6 shows a flow diagram of logic 600 of how this cost is calculated. In operation 602, the ROI system receives the merchant criteria selections. The merchant's total cost includes the repeat revenue cost, the additional spend cost, and the merchant's check cost. The costs may be calculated by multiplying the corresponding revenue by the received food cost, as described previously. Accordingly, in operation 604, the ROI system calculates the repeat revenue cost. In one embodiment, this calculation comprises multiplying the repeat customer revenue 132 by the Food Cost 128. In operation 606, the ROI system calculates the additional spend cost. In one such embodiment, this calculation comprises multiplying the additional spend revenue 132 by the Food Cost 128. In operation 608, the ROI system calculates the merchant's check cost 144, which in one embodiment comprises multiplying the Your Groupon Check revenue 136 by the Average Groupon Value 108 and the Food Cost 128. Accordingly, in operation 610, the ROI system determines the merchant's total cost by adding together the repeat revenue cost, the additional spend cost, and the merchant's check cost.

FIG. 7 shows a flow diagram 700 describing an example mechanism by which merchant profit is calculated. In operation 702, the ROI system receives the merchant criteria selections. In operation 705, the ROI system calculates the merchant revenue. In one embodiment, the merchant revenue is calculated as shown above in operation 510. Subsequently, in operation 706, the ROI system calculates the merchant cost. In one embodiment, the merchant cost is calculated as shown above in operation 610. Finally, in operation 708, the ROI system determines the merchant profit. In this regard, the merchant's profit comprises the merchant revenue minus the merchant cost.

In some embodiments, the ROI system subsequently generates (or updates) a graphical representation displaying the first, second, third, and fourth amounts. In one such embodiment, the graphical representation comprises a first histogram representative of the first, second, and third amounts, and a second histogram representative of the fourth amount. Examples of such graphical representations may be found in FIGS. 1-3*b*. The graphical representation may provide a forecast using a predictive wizard (i.e., software that automatically calculates outcomes based on various inputs), analytics/demographics (e.g., historical information), similar promotions, or any combination thereof. In some cases, this forecast may include expected profit, an expected number of new customers, an indication of the investment spent per new customer, or an indication of a ratio showing an expected return on investment (shown, for example, in FIG. 1, elements 152, 156, 158, and 160, respectively).

In some embodiments, the graphical representation may be a graphical consumer interface (GUI) with which the merchant and sales representative may provide the inputs used in the above-described calculations and forecasts. In such embodiments, the ROI system may receive input from the sales representative to lock or unlock certain fields in the interface and may allow off-line merchant manipulation of the graphical representation. Accordingly, the unified payment and ROI system may generate a real-time ROI as output for one or more promotions.

ROI Learning Model

In some example embodiments, attribute analysis for predicting ROI or ROI components includes a pattern recognition algorithm for processing historic metrics to determine a given providers ROI based on the providers attributes. Cluster analysis and classification algorithms are two examples of pattern recognition algorithms that may be used to perform processing using statistical inference. In cluster analysis, an input pattern is assigned to one of several groups (clusters) of the same type of patterns. Patterns within the same cluster are likely to be more similar to each other than they are similar to patterns assigned to different clusters. A classification algorithm (i.e. classifier) maps an input pattern into one of several categories in which the pattern is most likely to belong.

Machine learning is often used to develop a particular pattern recognition algorithm (i.e. an algorithm that represents a particular pattern recognition problem) that is based on statistical inference. For example, a set of clusters may be developed using unsupervised learning, in which the number and respective sizes of the clusters is based on calculations of similarity of features of the patterns within a previously collected training set of patterns. In another example, a classifier representing a particular categorization problem may be developed using supervised learning based on using a training set of patterns and their respective known categorizations. Each training pattern is input to the classifier, and the difference between the output categorization generated by the classifier and the known categorization is used to adjust the classifier coefficients to more accurately represent the problem. A classifier that is developed using supervised learning also is known as a trainable classifier.

In embodiments, content analysis includes a source-specific classifier that takes a source-specific representation of the content received from a particular source as an input and produces an output that categorizes the provider attributes in such a way to predict certain metric values that can be used to calculate an ROI or ROI component.

Figure 7A:
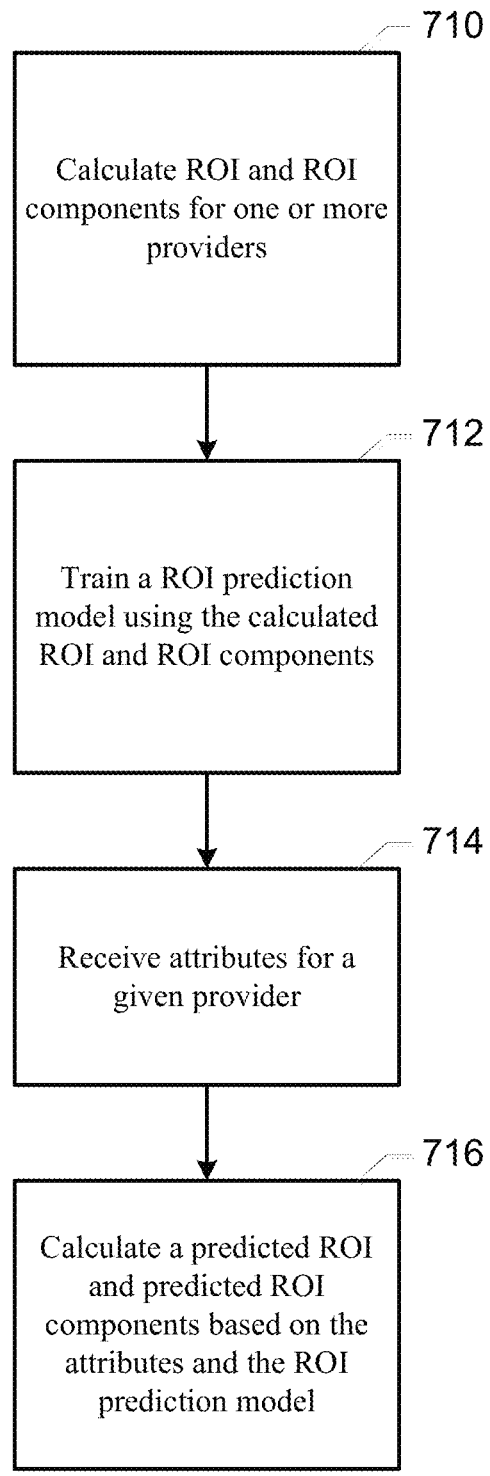
FIG. 7a shows a flow diagram of example operations used by the payment system to schedule and distribute funds to a merchant.

FIG. 7*a* shows an example method that may be executed by a unified payment and ROI system to train and execute an ROI prediction model that is configured to predict ROI and ROI components based on provider attributes and one or more historical metrics. As is shown in block 710, ROI and/or ROI components are calculated for one or more providers. In some example, embodiments, the ROI and/or ROI components may be calculated based on one or more metrics generated from surveys, marketing exposure, financial engineering, in-store transactions and/or the like. The metrics may include but are not limited to:

| ID Metric | Description |
|---|---|
| 1. Delta | In some examples, Delta is the time period used to define new, lapsed, existing, and returning transactions. This is an input assumption and the default may take the form of delta = 90 days. Given a consumer and a transaction by that consumer, the transaction is considered new/lapsed if there are no transactions by the same consumer in the preceding delta days, and vice versa for existing/returning. A lapsed transaction, for example, has no transactions by the same consumer in the preceding delta days, but there are transactions by the same consumer more than delta days ago. Note that if a transaction is less than delta days from the min_tran_date (see below), then the status of the transaction as new/lapsed or returning is undefined. |
| 2. final_redemption_pct | The fraction of Groupons redeemed at the time of campaign expiration. This is an input assumption and the default may take the form of 0.85. |
| 3. cc_fee_pct | Credit card fee percentage. There is a fee charged by the credit card company when customers purchase Groupons, in some examples, using their credit card on the Groupon website. This fee is a percentage of the transaction amount and it comes out of the provider's share of the Groupon sales. This is an input assumption and the default may take the form of 0.025. |
| 4. alpha | Significance level of the confidence intervals. The confidence level is 1 - alpha. This is an input assumption and the default may take the form of 0.05 (95% confidence). |
| 5. cog_pct | Cost of goods or services as a percentage of the total bill. This input assumption is tabulated by provider category and subcategory. E.g. for providers in category Restaurants and subcategory American/Traditional, the cog_pct is 0.37. In this case, the provider cost for a total bill of $100 (excluding tips but including tax) is assumed to be $37. |
| 6. tips_pct | Tips as a percentage of the total bill. This is currently assumed to be 20% for providers in categories Restaurants and Beauty & Spas and 0% otherwise. This is used, in some examples, to back out the estimated total bill, excluding tip, from the actual transaction amount. |
| 7. min_tran_date | The date of the first transaction in the data for a provider, expressed as a number. Use the mysql function from_days( ) to get the actual date. |
| 8. max_tran_date | The date of the last transaction in the data for a provider, expressed as a number. Use the mysql function from_days( ) to get the actual date. |
| 9. num_txn | The number of total transactions in the data for a provider. |
| 10. num_coupons_sold | Number of Groupons sold. |
| 11. num_cstmr | Number of unique customers who purchased Groupons. |
| 12. num_coupons_redeemed_td | Number of Groupons redeemed to-date. |
| 13. num_coupons_redeemed_proj | Projected number of Groupons redeemed at campaign expiration. |
| 14. num_cstmr_redeemed_td | Number of unique customers who redeemed Groupons to-date. |
| 15. num_cstmr_redeemed_proj | Projected number of unique customers who redeemed Groupon at campaign expiration. |
| 16. num_email_impressions | Number of email impressions. |
| 17. unit_value_avg | The average Groupon unit value weighted by the number sold. |
| 18. unit_price_avg | The average Groupon unit price weighted by the number sold. |
| 19. unit_buy_price_avg | The average Groupon unit buy price weighted by the number sold. |
| 20. num_new_cstmr | Number of new/lapsed customers activated by Groupon. This number reflects only those customers who appear in our transaction data. Generally, these are customers who have used |

-continued

| ID Metric | Description |
|---|---|
| | their Groupon-registered credit cards at the provider.<br>More specifically, and by way of example, new customers are those who:<br>1  Bought a Groupon<br>2  Had an in-store transaction using a registered credit card after Groupon purchase<br>3  Have not visited the store in the delta days before the in-store transaction<br>4  If visit is by a lapsed customer, there are no visits between the visit and the Groupon purchase date |
| 21. num_existing_cstmr | Number of existing customers who use Groupon. See num_new_cstmr above for important example caveats. Existing customers are those who:<br>1  Bought a Groupon<br>2  Had an in-store transaction using a registered credit card after Groupon purchase<br>3  Had visited the store in the delta days before the in-store transaction<br>4  The previous visit must be before the Groupon purchase date |
| 22. new_cstmr_fraction | The customer fraction is defined as, in some examples:<br>$$\text{new cstmr fraction} = \frac{\text{num new cstmr}}{\text{num new cstmr} + \text{num existing cstmr}}$$<br>This metric is used to estimate the new customer fraction of all Groupon customers of the provider, even though it is calculated based only on the subpopulation of consumers whose transactions we are able to track. |
| 23. existing_cstmr_fraction | The existing customer fraction is defined as, in some examples:<br>$$\text{existing cstmr fraction} = \frac{\text{num existing cstmr}}{\text{num new cstmr} + \text{num existing cstmr}}$$<br>Similar to new_cstmr_fraction, this metric is used to estimate the existing customer fraction of all Groupon customers of the provider. |
| 24. new_cstmr_fraction_survey | The new customer fraction based on email survey data. The survey new customers are those who indicated that they have never been to the provider before. Note that new_cstmr_fraction_survey does not measure the same thing as new_cstmr_fraction in some examples, as new_cstmr_fraction include also lapsed customers. |
| 25. lapsed_cstmr_fraction_survey | The lapsed customer fraction based on email survey data. The survey lapsed customers are those, in some examples, who indicated that they have visited the store before, but more than 90 days ago. |
| 26. new_lapsed_cstmr_fraction_survey | The new and lapsed customer fraction based on email survey data. This metric is analogous to new_cstmr_fraction in examples where delta = 90. |
| 27. existing_cstmr_fraction_survey | The existing customer fraction based on email survey data. The survey existing customers are those, in some examples, who indicated that they have visited the store in the past 90 days. This metric is analogous to existing_cstmr_fraction, but only if delta = 90. |
| 28. new_cstmr_fraction_best | This is either new_cstmr_fraction or new_lapsed_cstmr_fraction_survey. The rule to determine which metric to use is described, for example, in overspend_avg_best. This is the customer fraction used in subsequent calculations. |
| 29. existing_cstmr_fraction_best | Existing customer fraction defined, for example, as 1 − new_cstmr_fraction_best. This is the customer fraction used in subsequent calculations. |
| 30. overspend_avg | The average overspend estimated from data entered by the provider. The data is, for example, the amount_spent column in the |

-continued

| ID Metric | Description |
|---|---|
| | campaign_membership_coupons table in groupon_production. It is assumed, in some examples, that the value in the amount_spent columns is the total bill including the Groupon value but excluding tips. |
| 31. matched_redemption_overspend_avg | The average overspend estimated from transactions matched to redemptions. |
| 32. overspend_frac_cat_avg | The fraction of consumers who overspend averaged by provider category. This quantity is, for example, measured from data entered by providers. |
| 33. overspend_avg_est | Estimated average overspend is calculated for example by:<br>overspend_avg_est = matched_redemption_overspend_avg * overspend_frac_cat_avg |
| 34. overspend_avg_best | A "best estimate" of the average overspend and is, in some examples, either overspend_avg or overspend_avg_est. This metric is used in the calculation of other metrics, such as the overspend revenue. The rules to determine which one to use, in some examples, are as follows:<br>1 If overspend_avg_est cannot be computed (usually because there are no matched redemptions), use overspend_avg<br>2 Else if overspend_avg cannot be computed (usually because the provider did not track this number), or if overspend_avg/SE(overspend_avg) < 1 and overspend_avg_est/SE(overspend_avg_est) > 1, then use overspend_avg_est. Here SE(x) is the standard error of x.<br>3 Else, use overspend_avg. |
| 35. ret_fraction_new | Fraction of new/lapsed customers who return. |
| 36. ret_freq_new | Return frequency of new/lapsed Groupon customers. The return frequency is computed, for example, using a maximum likelihood estimate with the assumption that the number of return visits by a customer follows a Poisson distribution. |
| 37. ret_freq_new_ret_only | Return frequency of new/lapsed Groupon customers with observed return visits. |
| 38. avg_spend_ret_new | Average spend of new/lapsed Groupon customers on return visits. |
| 39. ret_fraction_all_new | Return fraction of all new/lapsed customers, both Groupon and non-Groupon. |
| 40. ret_freq_all_new | Return frequency of all new/lapsed customers. |
| 41. ret_freq_all_new_ret_only | Return frequency of all new/lapsed customers with observed return visits. |
| 42. avg_spend_ret_all_new | Average spend of all new/lapsed customers on return visits. |
| 43. ret_fraction_new_est | Estimated example return fraction of new/lapsed Groupon customers. For example, can be defined as 0.7 * ret_fraction_all_new. |
| 44. ret_freq_new_est | Estimated example return frequency of new/lapsed Groupon customers. Currently defined, for example, as 1.0 * ret_freq_all_new. |
| 45. ret_freq_new_ret_only_est | Estimated return frequency of new/lapsed Groupon customers with observed return visits. Currently defined, for example, as 0.46 * ret_freq_all_new_ret_only. |
| 46. avg_spend_ret_new_est | Estimated average spend of new/lapsed Groupon customers on return visits. Currently defined, for example, as 0.8 * avg_spend_ret_all_new. |
| 47. ret_fraction_new_best | A "best estimate" return fraction of new/lapsed Groupon customers. Is it either ret_fraction_new or ret_fraction_new_est. The rules to determine which version to use are the Same as, in some examples, overspend_avg_best. |
| 48. ret_freq_new_ret_only_best | Same as, in some examples, ret_fraction_new_best but for return frequency of customers with observed return visits. |

-continued

| ID Metric | Description |
|---|---|
| 49. avg_spend_ret_new_best | Same as, in some examples, ret_fraction_new_best but for return average spend. |
| 50. num_ret_vst_td_new | Number of return visits to-date by new/lapsed Groupon customers. Defined as, in some examples:<br>num_ret_vst_td_new<br>=num_cstmr_redeemed_td *<br>new_cstmr_fraction *<br>ret_fraction_new_best *<br>ret_freq_new_best * nday / 365<br>Here nday is the average number of days since redemption averaged over all Groupon customers. |
| 51. num_ret_cstmr_td_new | Number of return customers to-date by new/lapsed Groupon customers. Defined as, for example:<br>num_ret_cstmr_td_new<br>=num_cstmr_redeemed_td *<br>new_cstmr_fraction *<br>ret_fraction_new_best |
| 52. num_email_mkt_vst_td | Number of email marketing visits to-date. |
| 53. num_email_mkt_vst_proj | Number of email marketing visits projected. |
| 54. avg_spend_email_mk | Average spend on email marketing visits. |
| 55. rev_groupon_campaign | Total revenue from Groupon campaigns. Estimated based on the number of "collected" coupons and the unit_buy_price with a correction for the credit card transaction fee. This may, in some examples, be different from the actual amount paid to the provider by Groupon. |
| 56. rev_email_mkt_td | Revenue to-date from email marketing visits. |
| 57. rev_email_mkt_proj | Projected revenue from email marketing visits. |
| 58. rev_overspend_td | Overspend revenue to-date from all Groupon customers. Defined as, in some examples:<br>rev_overspend_td =<br>num_coupons_redeemed_td *<br>overspend_avg_best |
| 59. rev_overspend_proj | This is the sum of the total overspend revenue from expired campaigns and the projected overspend revenue from active campaigns. The overspend revenue of expired campaigns is computed the same way as overspend revenue to-date. The projected overspend revenue is (number of projected redemptions) * (overspend_avg_best). |
| 60. rev_overspend_td_new | Overspend revenue to-date from new/lapsed Groupon customers. Defined as, in some examples:<br>rev_overspend_td_new = rev_overspend_td * new_cstmr_fraction |
| 61. rev_overspend_proj_new | Projected Overspend revenue from new/lapsed Groupon customers. Defined as, in some examples:<br>rev_overspend_proj_new =<br>rev_overspend_proj * new_cstmr_fraction |
| 62. rev_ret_td_new | Return visits revenue to-date from new/lapsed Groupon customers. Defined as, in some examples:<br>rev_ret_td_new = num_ret_vst_td_new *<br>avg_spend_ret_new_best |
| 63. rev_ret_proj_new | Projected Return visits revenue from new/lapsed Groupon customers. Defined as, in some examples:<br>rev_ret_proj_new =<br>num_coupons_redeemed_proj *<br>ret_fraction_new_best *<br>ret_freq_new_ret_only_best *<br>avg_spend_ret_new_best *<br>new_cstmr_fraction |
| 64. rev_tot_td | Total revenue to-date. Defined as, in some examples:<br>rev_tot_td = rev_groupon_campaign +<br>rev_overspend_td + rev_ret_td_new +<br>rev_email_mkt_td |
| 65. rev_tot_proj | Projected total revenue. Defined as, in some examples: |

-continued

| ID Metric | Description |
|---|---|
| | rev_tot_proj = rev_groupon_campaign + rev_overspend_proj + rev_ret_proj_new + rev_email_mkt_proj |
| 66. cog_email_mkt_td | Cost of goods to-date of email marketing visits. |
| 67. cog_email_mkt_proj | cog_email_mkt_proj |
| 68. cog_redemptions_td | Groupon redemption cost of goods to-date. Defined as, in some examples:<br>cog_redemptions_td = num_coupons_redeemed_td * cog_pct * (unit_value_avg + overspend_avg_best) |
| 69. cog_redemptions_proj | Projected Groupon redemption cost of goods to-date. Defined as, in some examples:<br>cog_redemptions_proj = num_coupons_redeemed_proj * cog_pct * (unit_value_avg + overspend_avg_best) |
| 70. cog_redemptions_td_new | Groupon redemption cost of goods to-date of new/lapsed customers. Defined as, in some examples:<br>cog_redemptions_td_new = cog_redemptions_td * new_cstmr_fraction |
| 71. cog_redemptions_proj_new | Projected Groupon redemption cost of goods of new/lapsed customers. Defined as, in some examples:<br>cog_redemptions_proj_new = cog_redemptions_proj * new_cstmr_fraction |
| 72. cog_discount_provided_td_existing | Discount provided to existing customers in Groupon campaign to-date. Defined as, in some examples:<br>cog_discount_provided_td_existing = existing_cstmr_fraction * num_coupons_redeemed_td * [unit_value_avg − (unit_buy_price_avg − unit_price_avg * cc_fee_pct)] |
| 73. cog_discount_provided_proj_existing | Discount provided to existing customers in Groupon campaign projected. Defined as, in some examples:<br>cog_discount_provided_td_existing = existing_cstmr_fraction * num_coupons_redeemed_proj * [unit_value_avg − (unit_buy_price_avg − unit_price_avg * cc_fee_pct)] |
| 74. cog_ret_td_new | Cost of goods associated with return visits to-date by new/lapsed Groupon customers. Defined as, in some examples:<br>cog_ret_td_new = rev_ret_td_new * cog_pct |
| 75. cog_ret_proj_new | Cost of goods (projected) associated with return visits by new/lapsed Groupon customers. Defined as, in some examples:<br>cog_ret_proj_new = rev_ret_proj_new * cog_pct |
| 76. cog_tot_td | Total cost of goods to-date. Defined as, in some examples:<br>cog_tot_td = cog_redemptions_td + cog_ret_td_new |
| 77. cog_tot_proj | Total cost of goods projected. Defined as, in some examples:<br>cog_tot_proj = cog_redemptions_proj + cog_ret_proj_new |
| 78. provider_profit_td | Total provider profit to-date. Defined as, in some examples:<br>provider_profit_td = rev_tot_td − cog_tot_td |
| 79. provider_profit_proj | Total provider profit projected. Defined as, in some examples:<br>provider_profit_proj = rev_tot_proj − cog_tot_proj |
| 80. tax_pct | Sales tax percentage |
| 81. num_email_impressions_featured | Number of email impressions in the feature position |
| 82. invoiced_groupon_campaign | Total invoiced payments for the Groupon campaign |

-continued

| ID Metric | Description |
|---|---|
| 83. payments_groupon_campaign | Total payments for the Groupon campaign |
| 84. payments_groupon_campaign_best | Either rev_groupon_campaign or payments_groupon_campaign depending on the payments data source |
| 85. invoiced_groupon_campaign_best | Either rev_groupon_campaign or invoiced_groupon_campaign depending on the payments data source |

As is shown in block 712, an ROI prediction model may be trained using historical calculated ROI, ROI components and related metrics. In some example embodiments, the ROI prediction model may take the form of a support vector machine, decision tree learning, association rule learning, artificial neural networking, inductive logic programming, clustering, and/or the like.

Using the previously computed metrics in block 710 (and related ROI and ROI components) a dataset may be generated that is configured to train and/or test the ROI prediction model to approximate ROI and/or ROI components based on certain provider attributes. In some example embodiments, the training may include classifying metrics, provider attributes or the like as effecting or otherwise informative of an ROI value or a particular ROI component. In other example embodiments, the ROI prediction model may additionally or alternatively be trained so that it may estimate a value of a particular metric for a provider based on that providers stated attributes. As such, the trained ROI prediction model may provide a predictive algorithm that is operable to predict ROI and/or ROI components using input provider attributes.

As is shown in block 714, one or more attributes may be received for a given provider. In some examples, the given provider may take the form of a current provider that is running a promotion, a provider interested in a running a promotion and/or the like. As such, in order to provide a predicted ROI and/or ROI components, the provider may provide attributes such as, size, category, location, past deal history, sales data, advertising data, current metrics and/or the like.

As is shown in block 716, a predicted ROI and/or predicted ROI components (such as is shown with reference to FIG. 3*a*) may be calculated for the provider based on the attributes and the ROI prediction model. In some example embodiments, the one or more attributes may be provided to the ROI prediction model. The ROI prediction model then may compare the receive attributes to its trained dataset, the comparison generating a prediction of ROI for the given provider based on ROI metrics for historical providers having similar attributes. The predicted ROI and/or predicated ROI components may then be provided for display via the impact report, such as is shown with reference to FIG. 3*e*.

System Components

Figure 8:
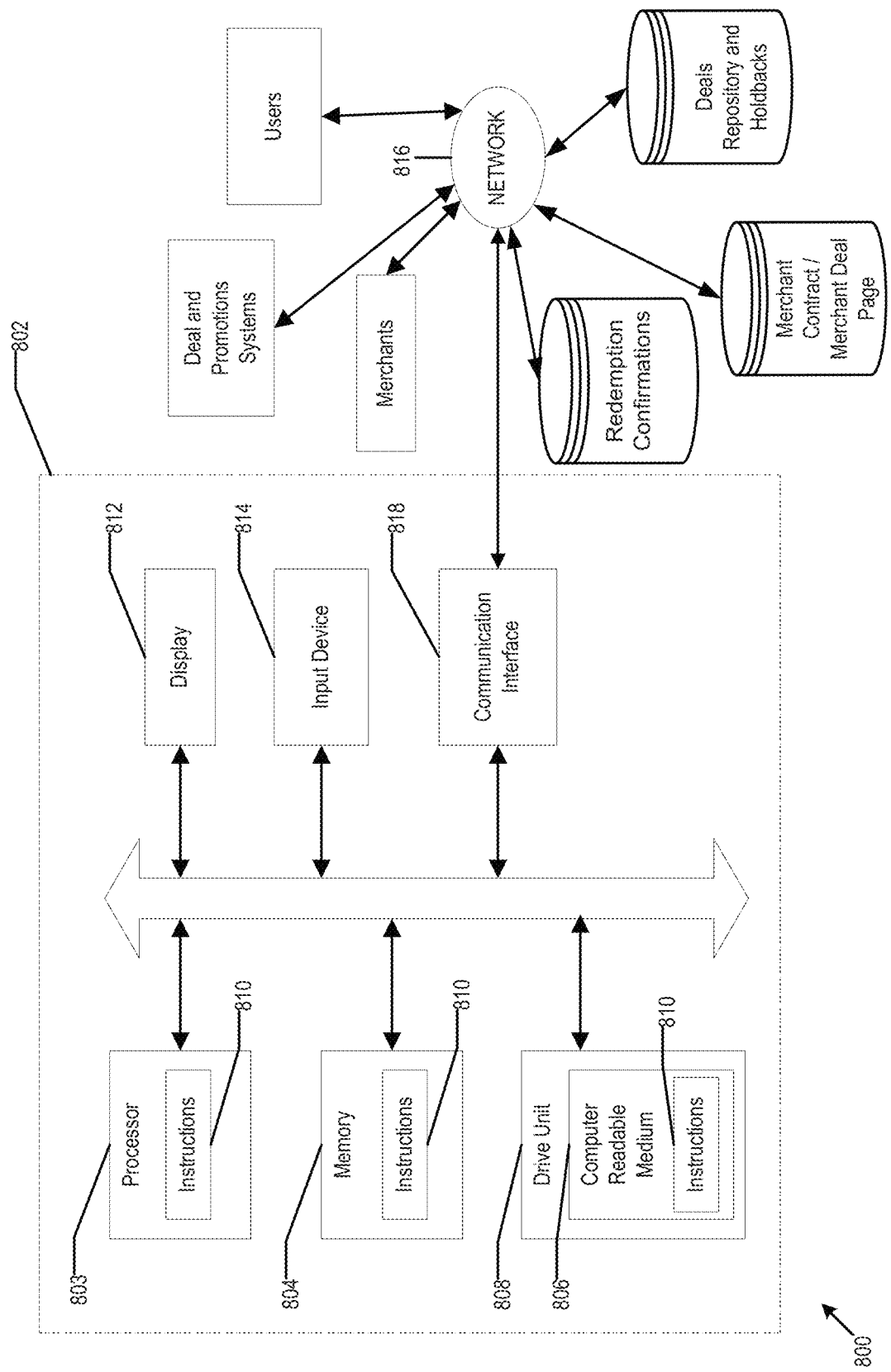
FIG. 8 shows a configuration of the unified payment and ROI system.

FIG. 8 shows configuration 800 of the unified payment and ROI system 802. The unified payment system 802 may be deployed as a general computer system used in a networked deployment. The unified payment system 802 may represent a remote server or local mobile device of the consumer. In other words, the unified payment logic may be executed by one or more processors locally or remotely located. The computer system may operate as a server or as a client consumer computer in a server-client consumer network environment, or as a peer computer system in a peer-to-peer (or distributed) network environment. The computer system may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 810 (sequential or otherwise) that specify actions to be taken by that machine. In a particular embodiment, the computer system may be implemented using electronic devices that provide voice, video or data communication. Further, while a single computer system may be illustrated, the term "system" shall also be taken to include any collection of systems or sub-systems that individually or jointly execute a set, or multiple sets, of instructions to perform one or more computer functions.

The computer system may include a processor 803, such as, a central processing unit (CPU), a graphics processing unit (GPU), or both. The processor may be a component in a variety of systems. For example, the processor may be part of a standard personal computer or a workstation. The processor may be one or more general processors, digital signal processors, application specific integrated circuits, field programmable gate arrays, servers, networks, digital circuits, analog circuits, combinations thereof, or other now known or later developed devices for analyzing and processing data. The processors and memories 804 discussed herein, as well as the claims below, may be embodied in and implemented in one or multiple physical chips or circuit combinations. The processor 803 may execute a software program 810, such as code generated manually (i.e., programmed).

The computer system 802 may include a memory 804 that can communicate via a bus. The memory 804 may be a main memory, a static memory, or a dynamic memory. The memory 804 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 804 may include a cache or random access memory for the processor. Alternatively or in addition, the memory 804 may be separate from the processor, such as a cache memory of a processor, the memory, or other memory. The memory 804 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 804 may be operable to store instructions executable by the processor. The functions, acts or tasks illustrated in the figures or described herein may be performed by the programmed processor executing the instructions stored in the memory. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system may further include a display 812, such as a liquid crystal display (LCD), an organic light emitting diode (OLED), a flat panel display, a solid state display, a cathode ray tube (CRT), a projector, a printer or other now known or later developed display device for outputting determined information. The display 812 may act as an interface for the consumer to see the functioning of the processor, or specifically as an interface with the software stored in the memory or in the drive unit.

Additionally, the computer system may include an input device 814 configured to allow a consumer to interact with any of the components of system. The input device may be a number pad, a keyboard, or a cursor control device, such as a mouse, or a joystick, touch screen display, remote control or any other device operative to interact with the system.

The computer system may also include a disk or optical drive unit. The disk drive unit 808 may include a computer-readable medium 806 in which one or more sets of instructions, e.g. software, can be embedded. Further, the instructions may perform one or more of the methods or logic as described herein. The instructions may reside completely, or at least partially, within the memory 804 and/or within the processor during execution by the computer system. The memory 804 and the processor also may include computer-readable media as discussed above.

The present disclosure contemplates a computer-readable medium 806 that includes instructions or receives and executes instructions responsive to a propagated signal, so that a device connected to a network 816 may communicate voice, video, audio, images or any other data over the network 816. Further, the instructions may be transmitted or received over the network 816 via a communication interface 818. The communication interface may be a part of the processor or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. Likewise, the additional connections with other components of the system 802 may be physical connections or may be established wirelessly. In the case of a service provider server, the service provider server may communicate with consumers through the communication interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The computer-readable medium 806 may be a single medium, or the computer-readable medium 806 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 806 may include a solid-state memory such as a memory card or other package that houses one or more non-volatile read-only memories. The computer-readable medium 806 also may be a random access memory or other volatile re-writable memory. Additionally, the computer-readable medium 806 may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium 806 may comprise a tangible storage medium. The computer-readable medium 806 may comprise a non-transitory medium in that it cannot be construed to refer to carrier signals or propagating waves. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A method for utilizing a collaborative, dual input, synchronizing system, the collaborative, dual input, synchronizing system comprised of a first graphical user interface (GUI) configured for display at a first device and a second GUI configured for display at a second device, the collaborative, dual input, synchronizing system configured to enable the first device and the second device to collaboratively work at a same time within a common visual representation, via the first GUI and the second GUI, collaboratively working including unlocking one or more particular fields contained in the common visual presentation and displayed via the first GUI and the second GUI, and enabling editing of the one or more particular fields via the first GUI and the second GUI, for arriving at a deal structure approved by both a merchant and a promotion and marketing service, by receiving, via the first GUI and the second GUI, from the first device and the second device, respectively, real time input in a form of editing, performing real-time calculations, and displaying, via the first GUI and the second GUI, in real-time, updates and changes, the method comprising:

providing the collaborative, dual input, synchronizing system by, simultaneously generating a merchant view, via the first GUI, configured for display on the first device and a sales representative view, via the second GUI, configured for display on the second device, both the first GUI and the second GUI configured to receive input and display real-time changes to displayed values based on the received input, wherein both the merchant view and the sales representative view comprise a reference deal structure, the reference deal structure comprised of pre-filled values to pre-populate one or more attributes, and selectable icons configured to receive user input;

receiving input from the second device, at the collaborative, dual input, synchronizing system, collaborative, dual input, synchronizing system having previously generated the sales representative view, via the second GUI, for display on the second device, the input indicating a status, the status being locked or unlocked, of at least one selectable icon, the status indicative of whether the merchant view, via the first GUI, configured for display on the first device is configured to display the at least one selectable icon;

dynamically updating, in real-time, by the collaborative, dual input, synchronizing system, of the merchant view at the first device, in accordance with the input from the second device of the at least one selectable icon to indicate a locked status, to display one or more fields, each indicated to be locked;

receiving input, from each of the first device and second device, indicative of one or more attributes of a provider or a promotion, wherein the input indicative of one or more attributes of the provider or the promotion includes input indicative of repeat business generated by the promotion;

generating, in real time by a processor, at least one of a predicted return on investment (ROI) value or a predicted ROI component value based at least in part on the one or more attributes of the provider or the promotion and a ROI prediction model;

calculating, by the processor and based on the input indicative of repeat business generated by the promotion, a repeat business revenue amount indicative of revenue, in dollars, generated from repeat business attendant to administering the promotion;

generating a merchant impact report including:
the at least one of the predicted ROI value or the predicted ROI component value for the promotion,
a first amount indicative of revenue generated from the promotion and a second amount indicative of costs of the promotion, wherein the first amount and the second amount are calculated based on the one or more attributes of the promotion, and
the repeat business revenue amount; and providing, in real-time, an updated first GUI and an updated second GUI, the updated first GUI and the updated second GUI configured to display updates to the merchant view configured for display on the first device and the sales representative view configured for display on the second device in accordance with the input received, the input being indicative of changed values entered at the first device by the merchant or at the second device by the sales representative regarding the one or more attributes of the provider or the promotion.

2. The method of claim 1, further comprising:
calculating at least one of an ROI value or an ROI component value for one or more merchants in relation to one or more historical promotions, wherein the at least one of the ROI value or the ROI component value is generated based on one or more metrics; and
training the ROI prediction model based on at least the portion of the at least one of the ROI value, the ROI component value, provider attributes or the one or more metrics.

3. The method of claim 2, further comprising:
testing the ROI prediction model based on at least another portion of the at least one of the ROI value, the ROI component value, provider attributes or the one or more metrics.

4. The method of claim 1, wherein the one or more metrics are generated based at least in part on one or more of a survey, a marketing exposure, a financial engineering or an in-store transaction.

5. The method of claim 1, wherein the input indicative of one or more attributes of the provider or the promotion is based on historical promotion data.

6. The method of claim 1, wherein the input indicative of one or more attributes of the provider or the promotion includes input indicative of an upsell amount, and wherein the method further comprises:

calculating, based on the upsell amount, a third amount indicative of revenue generated from promotion upsells; and presenting the merchant impact report including the first amount, the second amount, and the third amount.

7. The method of claim 1, wherein presenting the merchant impact report includes displaying, via the interface, the predicted ROI components, the predicted ROI components comprising at least one of revenue from repeat consumers, revenue from upsells or revenue from a promotion.

8. The method of claim 1, wherein the ROI prediction model is configured to predict a value of the one or more metrics.

9. An apparatus for utilizing a collaborative, dual input, synchronizing system, the collaborative, dual input, synchronizing system comprised of a first graphical user interface (GUI) configured for display at a first device and a second GUI configured for display at a second device, the collaborative, dual input, synchronizing system configured to enable the first device and the second device to collaboratively work at a same time within a common visual representation, via the first GUI and the second GUI, collaboratively working including unlocking one or more particular fields contained in the common visual presentation and displayed via the first GUI and the second GUI, and enabling editing of the one or more particular fields via the first GUI and the second GUI, for arriving at a deal structure approved by both a merchant and promotion and marketing service by receiving, via the first GUI and the second GUI, from the first device and the second device, respectively, real time input in a form of editing, performing real-time calculations, and displaying, via the first GUI and the second GUI, in real-time, updates and changes, the apparatus comprising:

at least one processor; and at least one non-transitory memory including computer program code, the at least one memory and the computer program code configured to, with the at least one processor, cause the apparatus to at least:

provide the collaborative, dual input, synchronizing system by, simultaneously generating a merchant view, via the first GUI, configured for display on the first device and a sales representative view, via the second GUI, configured for display on the second device, both the first GUI and the second GUI configured to receive input and display real-time changes to displayed values based on the received input, wherein both the merchant view and the sales representative view comprise a reference deal structure, the reference deal structure comprised of pre-filled values to pre-populate one or more attributes, and selectable icons configured to receive user input;

receive input from the second device, at the collaborative, dual input, synchronizing system, collaborative, dual input, synchronizing system having previously generated the sales representative view, via the second GUI, for display on the second device, the input indicating a status, the status being locked or unlocked, of at least one selectable icon, the status indicative of whether the merchant view, via the first GUI, configured for display on the first device is configured to display the at least one selectable icon;

dynamically update, in real-time, by the collaborative, dual input, synchronizing system, of the merchant view at the first device, in accordance with the input from the second device of the at least one selectable icon to indicate a locked status, to display one or more fields, each indicated to be locked;

receive input, from each of the first device and second device, indicative of one or more attributes of a provider or a promotion, wherein the input indicative of one or more attributes of the provider or the promotion includes input indicative of repeat business generated by the promotion;

generate, in real-time, at least one of a predicted return on investment (ROI) value or a predicted ROI component value based at least in part on the one or more attributes of the provider or the promotion and a ROI prediction model;

calculate, based on the input indicative of repeat business generated by the promotion, a repeat business revenue amount indicative of revenue generated from repeat business attendant to administering the promotion;

generate a merchant impact report including:

the at least one of the predicted ROI value or the predicted ROI component value for the promotion, a first amount indicative of revenue generated from the promotion and a second amount indicative of costs of the promotion, wherein the first amount and the second amount are calculated based on the one or more attributes of the promotion, and the repeat business revenue amount; and provide, in real-time, an updated first GUI and an updated second GUI, the updated first GUI and the updated second GUI configured to display updates to the merchant view configured for display on the first device and the sales representative view configured for display on the second device in accordance with the input received, the input being indicative of changed values entered at the first device by the merchant or at the second device by the sales representative regarding the one or more attributes of the provider or the promotion.

10. The apparatus of claim 9, wherein the at least one memory including the computer program code is further configured to, with the at least one processor, cause the apparatus to:

calculate at least one of an ROI value or an ROI component value for one or more merchants in relation to one or more historical promotions, wherein the at least one of the ROI value or the ROI component value is generated based on one or more metrics; and train the ROI prediction model based on at least the portion of the at least one of the ROI value, the ROI component value, provider attributes or the one or more metrics.

11. The apparatus of claim 10, wherein the at least one memory including the computer program code is further configured to, with the at least one processor, cause the apparatus to:

test the ROI prediction model based on at least another portion of the at least one of the ROI value, the ROI component value, provider attributes or the one or more metrics.

12. The apparatus of claim 9, wherein the one or more metrics are generated based at least in part on one or more of a survey, a marketing exposure, a financial engineering or an in-store transaction.

13. The apparatus of claim 9, wherein the input indicative of one or more attributes of the provider or the promotion is based on historical promotion data.

14. The apparatus of claim 9, wherein the input indicative of one or more attributes of the provider or the promotion includes input indicative of an upsell amount, and wherein the at least one memory including the computer program code is further configured to, with the at least one processor, cause the apparatus to:
   calculate, based on the upsell amount, a third amount indicative of revenue generated from promotion upsells; and
   present the merchant impact report including the first amount, the second amount, and the third amount.

15. The apparatus of claim 9, wherein presenting the merchant impact report includes displaying, via the interface, the predicted ROI components, the predicted ROI components comprising at least one of revenue from repeat consumers, revenue from upsells or revenue from a promotion.

16. The apparatus of claim 9, wherein the ROI prediction model is configured to predict a value of the one or more metrics.

17. A computer program product for utilizing a collaborative, dual input, synchronizing system, the collaborative, dual input, synchronizing system comprised of a first graphical user interface (GUI) configured for display at a first device and a second GUI configured for display at a second device, the collaborative, dual input, synchronizing system configured to enable the first device and the second device to collaboratively work at a same time within a common visual representation, via the first GUI and the second GUI, collaboratively working including unlocking one or more particular fields contained in the common visual presentation and displayed via the first GUI and the second GUI, and enabling editing of the one or more particular fields via the first GUI and the second GUI, for arriving at a deal structure approved by both a merchant and promotion and marketing service, by receiving, via the first GUI and the second GUI, from the first device and the second device, respectively, real time input in a form of editing, performing real-time calculations, and displaying, via the first GUI and the second GUI, in real-time, updates and changes, the computer program product comprising:
   at least one computer readable non-transitory memory medium having program code instructions stored thereon, the program code instructions which when executed by an apparatus cause the apparatus at least to:
   providing the collaborative, dual input, synchronizing system by, simultaneously generating a merchant view, via the first GUI, configured for display on the first device and a sales representative view, via the second GUI, configured for display on the second device, both the first GUI and the second GUI configured to receive input and display real-time changes to displayed values based on the received input,
   wherein both the merchant view and the sales representative view comprise a reference deal structure, the reference deal structure comprised of pre-filled values to pre-populate one or more attributes, and selectable icons configured to receive user input;
   receive input from the second device, at the collaborative, dual input, synchronizing system, collaborative, dual input, synchronizing system having previously generated the sales representative view, via the second GUI, for display on the second device, the input indicating a status, the status being locked or unlocked, of at least one selectable icon, the status indicative of whether the merchant view, via the first GUI, configured for display on the first device is configured to display the at least one selectable icon;
   dynamically update, in real-time, by the collaborative, dual input, synchronizing system, of the merchant view at the first device, in accordance with the input from the second device of the at least one selectable icon to indicate a locked status, to display one or more fields, each indicated to be locked;
   receive input, from each of the first device and second device, indicative of one or more attributes of a provider or a promotion, wherein the input indicative of one or more attributes of the provider or the promotion includes input indicative of repeat business generated by the promotion;
   generate, in real-time, at least one of a predicted return on investment (ROI) value or a predicted ROI component value based at least in part on the one or more attributes of the provider or the promotion and a ROI prediction model;
   calculate, based on the input indicative of repeat business generated by the promotion, a repeat business revenue amount indicative of revenue generated from repeat business attendant to administering the promotion;
   generate a merchant impact report including:
      the at least one of the predicted ROI value or the predicted ROI component value for the promotion,
      a first amount indicative of revenue generated from the promotion and a second amount indicative of costs of the promotion, wherein the first amount and the second amount are calculated based on the one or more attributes of the promotion, and
      the repeat business revenue amount; and
   providing, in real-time, an updated first GUI and an updated second GUI, the updated first GUI and the updated second GUI configured to display updates to the merchant view configured for display on the first device and the sales representative view configured for display on the second device in accordance with the input received, the input being indicative of changed values entered at the first device by the merchant or at the second device by the sales representative regarding the one or more attributes of the provider or the promotion.

18. The computer program product of claim 17, further comprising program code instructions, the program code instructions which when executed by the apparatus further cause the apparatus at least to:
   calculate at least one of an ROI value or an ROI component value for one or more merchants in relation to one or more historical promotions, wherein the at least one of the ROI value or the ROI component value is generated based on one or more metrics; and
   train the ROI prediction model based on at least the portion of the at least one of the ROI value, the ROI component value, provider attributes or the one or more metrics.

19. The computer program product claim 17, further comprising program code instructions, the program code instructions which when executed by the apparatus further cause the apparatus at least to:
   test the ROI prediction model based on at least another portion of the at least one of the ROI value, the ROI component value, provider attributes or the one or more metrics.

20. The computer program product of claim 17, wherein the one or more metrics are generated based at least in part on one or more of a survey, a marketing exposure, a financial engineering or an in-store transaction.

21. The computer program product of claim 17, wherein the input indicative of one or more attributes of the provider or the promotion is based on historical promotion data.

22. The computer program product of claim 17, further comprising program code instructions, the program code instructions which when executed by the apparatus further cause the apparatus at least to:
 calculate, based on the upsell amount, a third amount indicative of revenue generated from promotion upsells; and
 present the merchant impact report including the first amount, the second amount, and the third amount.

23. The computer program product of claim 17, wherein presenting the merchant impact report includes displaying, via the interface, the predicted ROI components, the predicted ROI components comprising at least one of revenue from repeat consumers, revenue from upsells or revenue from a promotion.

24. The computer program product of claim 17, wherein the ROI prediction model is configured to predict a value of the one or more metrics.

* * * * *